(12) United States Patent
Philipp

(10) Patent No.: US 12,058,260 B2
(45) Date of Patent: Aug. 6, 2024

(54) SYSTEM AND METHOD FOR SECURING DATA

(71) Applicant: Nili Philipp, Beit Shemesh (IL)

(72) Inventor: Nili Philipp, Beit Shemesh (IL)

( * ) Notice: Subject to any disclaimer, the term of this patent is extended or adjusted under 35 U.S.C. 154(b) by 282 days.

(21) Appl. No.: 17/435,435

(22) PCT Filed: Feb. 24, 2020

(86) PCT No.: PCT/IB2020/051537
§ 371 (c)(1),
(2) Date: Sep. 1, 2021

(87) PCT Pub. No.: WO2020/170225
PCT Pub. Date: Aug. 27, 2020

(65) Prior Publication Data
US 2022/0069995 A1    Mar. 3, 2022

Related U.S. Application Data

(60) Provisional application No. 62/943,804, filed on Dec. 4, 2019, provisional application No. 62/809,661, filed on Feb. 24, 2019.

(51) Int. Cl.
| | | |
|---|---|---|
| G06F 21/45 | (2013.01) | |
| G06F 21/62 | (2013.01) | |
| H04L 9/06 | (2006.01) | |
| H04L 9/14 | (2006.01) | |
| H04L 9/30 | (2006.01) | |
| H04L 9/32 | (2006.01) | |

(Continued)

(52) U.S. Cl.
CPC .............. *H04L 9/30* (2013.01); *H04L 9/0656* (2013.01); *H04L 9/3218* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2013/0136255 A1* | 5/2013 | Brown | H04L 9/0869 380/28 |
| 2016/0149879 A1* | 5/2016 | Haynes | H04L 63/067 713/170 |

(Continued)

OTHER PUBLICATIONS

A one-time pad color image cryptosystem based on SHA-3 and multiple chaotic systems. Wang. Elsevier. (Year: 2018).*

*Primary Examiner* — Venkat Perungavoor
(74) *Attorney, Agent, or Firm* — AlphaPatent Associates Ltd.; Daniel J. Swirsky

(57) ABSTRACT

Securing encrypted data by obtaining a credential including a plaintext string and a seed, deriving from the credential, a scrambling key and a corresponding unscrambling key, where the corresponding unscrambling key is based on a pseudo-random permutation derived from the credential, obtaining encrypted data, where the encrypted data is encrypted with a primary scheme that is independent of the credential, applying the scrambling key to the encrypted data to produce scrambled encrypted data, where recovering the encrypted data from the scrambled encrypted data requires applying the unscrambling key, and replacing the encrypted data with the scrambled encrypted data, thereby securing the encrypted data with the independent credential.

2 Claims, 15 Drawing Sheets

(51) Int. Cl.
  *G06F 21/71*   (2013.01)
  *H04L 9/00*    (2022.01)
  *H04L 9/16*    (2006.01)

(56)        References Cited

U.S. PATENT DOCUMENTS

2019/0116026 A1*  4/2019  Simske .............. H04N 1/32112
2019/0197260 A1*  6/2019  Wang ................... G06F 21/606
2019/0251199 A1*  8/2019  Klianev ................. G06Q 40/04
2020/0005290 A1*  1/2020  Madisetti ............. G06Q 20/065
2020/0052899 A1*  2/2020  Finlow-Bates ....... H04L 9/0863
2023/0419308 A1* 12/2023  Madisetti ............... G06Q 20/38

* cited by examiner

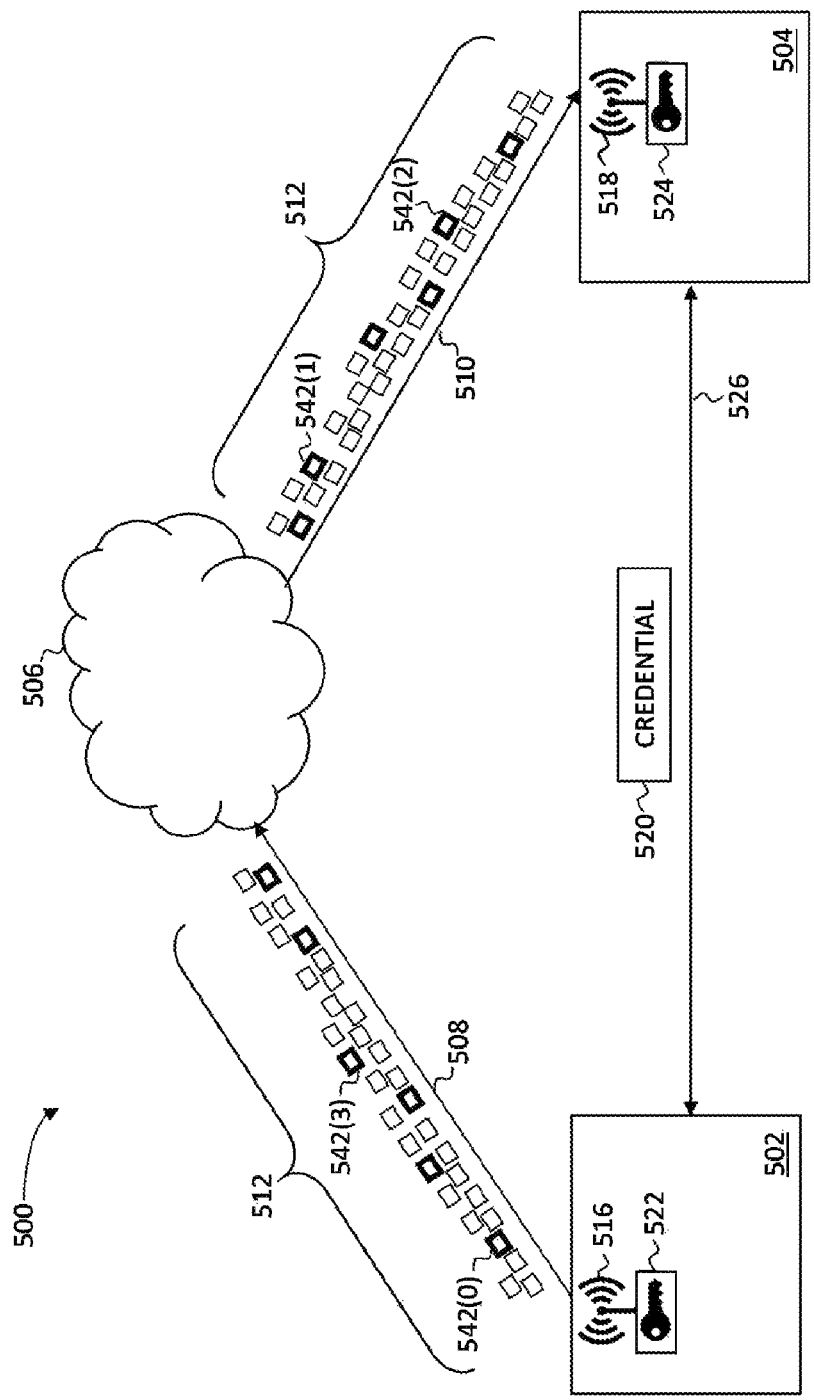

SYSTEM AND METHOD FOR SECURING DATA

CROSS-REFERENCE TO RELATED APPLICATIONS

This application claims the benefit of priority of U.S. Provisional Application No. 62/809,661, filed Feb. 24, 2019, and U.S. Provisional Application No. 62/943,804, filed Dec. 4, 2019, the contents of which are incorporated herein by reference in their entirety.

FIELD

The invention relates to encryption in general, and to methods for securing encrypted data with an independent credential.

BACKGROUND

Encryption is an essential component of data security protocols. As more people come to depend on computers for a greater number of services, reliable encryption has become indispensable. One of the simplest and most reliable encryption schemes is a "one-time pad" that uses a secret, hard-to-guess credential to conceal (i.e. "pad") plaintext data in a bit-wise manner. Each bit of the plaintext data is encrypted by adding to it a corresponding bit from the credential. However, this requires that the length of the credential is at least as long as the plaintext data. If the plaintext data is longer the credential must be used repeatedly, leading to vulnerabilities. One solution is to successively apply the credential in a "hash-chain". However, reversing the hash chain to recover the data is not feasible due to the one-way nature of cryptographic hash functions. Reversible encryption schemes such as the Advanced Encryption Standard (AES) are block cipher algorithms that use symmetric encryption to encrypt blocks of plaintext data. Applying symmetric encryption to very large files typically demands considerable computational resources.

Communications protocols, such as the Open Systems Interconnection (OSI) model and the Internet Protocol Suite (TCP/IP) divide the interfacing between devices into abstract layers, each providing a separate set of security protocols. At the high-level end, the "application layer" security handles interfacing with users, such as authentication via login that grants privileged access based on secret credentials. Lower level layers, such as the "transport layer" security, handles the encryption of data packets between devices using protocols such as the Transport layer security (TLS). The TLS handshake protocol establishes a unique session key between parties, for example by using a Diffie-Hellman key exchange. The session key is then used to encrypt data packets symmetrically to prevent eavesdroppers from accessing the data while in transit.

Public key cryptography employs asymmetric encryption to enable secure communication over an insecure network. Asymmetric encryption does not require parties to share a secret key. Rather, each party has a public/private key pair. The public key is shared, and the private key is kept secret. Data encrypted with a public key can only be decrypted with the corresponding private key to enable privacy. Data encrypted with a private key can only be decrypted with the corresponding public key, to enable authentication through digital certification. Common asymmetric encryption algorithms are RSA (Rivest Shamir Adelson), and elliptic curve techniques. Public key infrastructure (PKI) creates, manages, and distributes asymmetric encryption keys. PKI has come under scrutiny due to its extensive use over a wide range of security protocols, and the inherent cryptographic weakness of asymmetric encryption.

A common security vulnerability, known as Pass the Hash (PtH) attack, exploits the accessibility provided by many online services that opt to authenticate using hashed passwords in place of plaintext passwords. Hashing passwords is a common technique for protecting plaintext passwords due to the difficulty in reversing a cryptographic hash function. However, in a PtH attack, an attacker does not need the plaintext password to penetrate a victim's account, rather stealing the hashed password is sufficient. Authentication based on hashed passwords circumvents the need to reverse the cryptographic hash function. Once the attacker logs into the victim's account with the stolen hash, he can establish a secure TLS channel to access the victim's data. Although the channel is cryptographically secured, it is ineffective in protecting the victim's data since the it was established by the attacker. Thus, even though the password was protected by an irreversible hash and the data strongly encrypted, these techniques fail to protect from a PtH attack. Once the attacker has penetrated one victim's account, he may linger until an opportunity presents itself to steal the hashed passwords of many millions of users, leading to a system-wide breach.

Another vulnerability relates to the theft of digital certificates, which are key components of authentication protocols for many online services. Digital certification is enabled through PKI and is inherent to many technologies, such as distributed ledger technologies (DLT) and blockchains. Parties wishing to use these technologies often depend on certificate authorities (CAs) for issuing digital certificates. To facilitate transactions on DLTs, people often store their certificates remotely in a "hot wallet". Consequently, certificates are vulnerable to theft should an attacker penetrate the server storing the hot wallets or compromise the CA. To compound these vulnerabilities, advanced computing technologies poised to overcome inherent weaknesses in asymmetric encryption threaten to render these protocols obsolete, raising concerns of major disruptions to online commerce.

U.S. Pat. No. 10,097,522 B2, to Philipp, titled "Encrypted Query-Based Access to Data, relates to a searchable encryption (SE) scheme over fragmented data. Data labelled with a plaintext term is encrypted and fragmented into pieces, which are stored like scrambled "confetti". The plaintext term is used to derive multiple SE search queries, each indexing a different piece. The sequence by which the SE queries are derived corresponds to the sequence for assembling the pieces to recover the encrypted data.

SUMMARY

The following embodiments and aspects thereof are described and illustrated in conjunction with systems, tools and methods which are meant to be exemplary and illustrative, not limiting in scope.

There is provided, in accordance with an embodiment, a method for securing encrypted data, comprising: obtaining a credential comprising a plaintext string and a seed; deriving from the credential, a scrambling key and a corresponding unscrambling key, wherein the corresponding unscrambling key is based on a pseudo-random permutation derived from the credential; obtaining encrypted data, wherein the encrypted data is encrypted with a primary scheme that is independent of the credential; applying the scrambling key to the encrypted data to produce scrambled encrypted data, wherein recovering the encrypted data from the scrambled encrypted data requires applying the unscrambling key, and replacing the encrypted data with the scrambled encrypted data, thereby securing the encrypted data with the independent credential.

In some embodiments, the encrypted data is encrypted with the primary scheme at a first device, and wherein applying the scrambling key to produce the scrambled encrypted data is performed by a second device, wherein the credential is kept secret from the first device, thereby distributing data encryption between the first device and the second device.

In some embodiments, applying the scrambling key to produce the scrambled encrypted data is performed by a first device, the first device configured to transmit the scrambled encrypted data to a second device, wherein applying the unscrambling key to recover the encrypted data is performed by the second device, wherein the credential is shared between the first device and the second device.

In some embodiments, the method further comprises deriving a deterministic sequence of keys from the seed, deriving a pseudo-random sequence of hash codes from the plaintext string and the deterministic sequence of keys, sorting the pseudo-random sequence of hash codes to produce a sorted sequence, and creating a hash mapping between the pseudo-random sequence and the sorted sequence, wherein the pseudo-random permutation corresponds to the hash mapping, wherein applying the scrambling key by the first device comprises: fragmenting the encrypted data into pieces, wherein recovering the encrypted data from the pieces requires combining the pieces according to an original sequence, mapping the pseudo-random sequence of hash codes to the pieces ordered according to the original sequence to create a packet mapping, creating multiple packets, each of the packets comprising one of the pieces combined with one of the hash codes in accordance with the packet mapping, wherein the one piece corresponds to a payload and wherein the one hash code corresponds to a header of the packet, and scrambling the multiple packets, wherein transmitting the scrambled encrypted data comprises transmitting the multiple scrambled packets, thereby applying the credential as a digital transmitter that transmits the encrypted data at a digital carrying frequency corresponding to the pseudo-random sequence of hash codes derived from the credential, wherein applying the unscrambling key comprises: storing the hash codes in a sorted lookup tabled, matching the headers of the multiple scrambled packets against the hash codes in the sorted lookup table, thereby ordering the multiple packets according to the sorted sequence, extracting the payloads of the multiple packets, thereby ordering the multiple payloads according to the sorted sequence, applying the pseudo-random permutation to the payloads ordered according to the sorted sequence, thereby ordering the payloads according to the original sequence, and combining the payloads ordered according to the original sequence to recover the encrypted data, thereby applying the credential as a digital receiver that receives the encrypted data at the digital carrying frequency corresponding to the pseudo-random sequence of hash codes derived from the credential.

In some embodiments, transmitting the multiple scrambled packets further comprises creating additional packets that are indistinguishable from the multiple scrambled packets and transmitting the multiple additional packets interspersed with the multiple scrambled packets, thereby obfuscating the transmitting of the multiple scrambled packets from the first device to the second device.

There is provided, in accordance with another embodiment of the invention, a system for securing encrypted data, comprising: at least one hardware processor, and at least one non-transitory memory device having embodied thereon program code executable by the at least one hardware processor to: obtain a credential comprising a plaintext string and a seed; derive from the credential, a scrambling key and a corresponding unscrambling key, wherein the corresponding unscrambling key is based on a pseudo-random permutation derived from the credential; obtain encrypted data, wherein the encrypted data is encrypted with a primary scheme that is independent of the credential; apply the scrambling key to the encrypted data to produce scrambled encrypted data, wherein recovering the encrypted data from the scrambled encrypted data requires applying the unscrambling key, and replace the encrypted data with the scrambled encrypted data, thereby securing the encrypted data with the independent credential.

In some embodiments, plaintext string is associated with at least one of: a password, a passphrase, biometric information, a message, a query term, a device identifier, a user identifier, a timestamp, a location identifier, an address, and a label.

In some embodiments, the scrambling key is based on the pseudo-random permutation, wherein the at least one processor is configured to apply the scrambling key to the encrypted data by fragmenting the encrypted data into pieces and applying the pseudo-random permutation to the pieces, and to apply the unscrambling key by fragmenting the scrambled encrypted data into scrambled encrypted pieces and apply the inverse of the pseudo-random permutation to the scrambled encrypted pieces.

In some embodiments, the credential is associated with a first security protocol, and wherein the primary encryption scheme is associated with a second security protocol, thereby coupling the first security protocol to the second security protocol.

In some embodiments, the system further comprises a first device comprising a first one of the hardware processors and a first one of the non-transitory memory devices, a second device comprising a second one of the hardware processors and a second one of the non-transitory memory devices, and a communications channel connecting the first device with the second device, wherein the first device is configured to encrypt with the primary scheme to produce the encrypted data and transmit the encrypted data to the second device over the communications channel, wherein the second device is configured to derive the scrambling key from the credential and apply the scrambling key to produce the scrambled encrypted data, wherein the credential is kept secret from the first device, thereby distributing data encryption between the first device and the second device.

In some embodiments, the system further comprises a first device comprising a first one of the hardware processors and a first one of the non-transitory memory devices, a second device comprising a second one of the hardware processors and a second one of the non-transitory memory devices, and a communications channel connecting the first device with the second device, wherein the first device is configured apply the scrambling key to produce the scrambled encrypted data and transmit the scrambled encrypted data to the second device over the communications channel, wherein the second device is configured to apply the unscrambling key to recover the encrypted data, wherein the credential is shared between the first device and the second device.

In some embodiments, the at least one hardware processor is further configured to: derive a deterministic sequence of keys from the seed, derive a pseudo-random sequence of hash codes from the plaintext string and the deterministic sequence of keys, sort the pseudo-random sequence of hash codes to produce a sorted sequence, and create a hash mapping between the pseudo-random sequence and the sorted sequence, where the pseudo-random permutation corresponds to the hash mapping, wherein the first device is configured to apply the scrambling key to produce the scrambled encrypted data by: fragmenting the encrypted data into pieces, wherein recovering the encrypted data from the pieces requires combining the pieces according to a first sequence, mapping the pseudo-random sequence of hash codes to the pieces ordered according to the first sequence to create a second mapping, creating multiple packets, each of the packets comprising one of the pieces combined with one of the hash codes in accordance with the second mapping, wherein the one piece corresponds to a payload and wherein the one hash code corresponds to a header of the packet, and scrambling the multiple packets, and wherein transmitting the scrambled encrypted data to the second device comprises transmitting the multiple scrambled packets, thereby applying the credential as a digital transmitter that transmits the encrypted data at a digital carrying frequency corresponding to the pseudo-random sequence of hash codes derived from the credential, and wherein the second device is configured to apply the unscrambling key to recover the encrypted data by: storing the hash codes in a sorted lookup tabled, matching the headers of the multiple scrambled packets against the hash codes in the sorted lookup table, thereby ordering the multiple packets according to the sorted sequence, extracting the multiple payloads of the multiple packets ordered according to the sorted sequence, applying the pseudo-random permutation to the multiple payloads, thereby ordering the multiple payloads according to the first sequence, and combining the multiple payloads according to the first sequence, thereby applying the credential as a digital receiver that receives the encrypted data at the digital carrying frequency corresponding to the pseudo-random sequence of hash codes derived from the credential.

In some embodiments, the first device is further configured to create additional packets that are indistinguishable from the multiple scrambled packets and transmit the multiple additional packets interspersed with the multiple scrambled packets, thereby obfuscating the transmitting of the multiple scrambled packets from the first device to the second device.

In some embodiments, the additional packets are any of noise packets, and third-party message packets targeted for a third device, where the third-party message packets are identified by the second device as noise packets.

In some embodiments, the encrypted data comprises a response message sent from the first device to the second device, and wherein the credential corresponding to the digital carrying frequency for transmitting the response message is derived from an initial message transmitted from the second device to the first device at an initial digital carrying frequency corresponding to an initial credential shared between the first and second devices, thereby hopping from the initial digital carrying frequency carrying the initial message to the digital carrying frequency derived on the initial message and carrying the response message.

There is provided in accordance with another embodiment of the invention, a method for securing encrypted data, comprising: establishing a credential based on a user-defined plaintext string; obtaining encrypted data, encrypted under a public key cryptography scheme, wherein the credential is independent of the public key cryptography scheme; and applying the credential as a symmetric key to increase the entropy of the encrypted data encrypted under the public key cryptography scheme, thereby securing the encrypted data with the credential.

In some embodiments, the method further comprises deriving a one-time pad from the credential, wherein applying the credential comprises adding the one-time pad to the encrypted data.

In some embodiments, the encrypted data corresponds to a public address on a distributed ledger, wherein the credential is applied to secure a transfer of a token to the public address on the distributed ledger, and wherein redeeming the token on the distributed ledger requires publishing a zero-knowledge proof of the credential on the distributed ledger.

There is provided, in accordance with another embodiment of the invention, a system for securing encrypted data, comprising: at least one hardware processor, and at least one non-transitory memory device having embodied thereon program code executable by the at least one hardware processor to: establish a credential based on a user-defined plaintext string; obtain encrypted data, encrypted under a public key cryptography scheme, wherein the credential is independent of the public key cryptography scheme; and apply the credential as a symmetric key to the encrypted data encrypted under the public key cryptography scheme, thereby securing the encrypted data with the credential.

In some embodiments, the at least one hardware processor is further configured to derive a one-time pad from the credential, wherein applying the credential comprises adding the one-time pad to the encrypted data.

In some embodiments, the system further comprises a first device comprising a first one of the hardware processors and a first one of the non-transitory memory devices, a second device comprising a second one of the hardware processors and a second one of the non-transitory memory devices, a computer network configured to implement a distributed ledger, and a communications channel, wherein the first and second devices communicate with the computer network over the communications channel, wherein the credential is applied to secure a transfer of a token from a first user account on the distributed ledger, the first user account associated with the first device, to a second user account on the distributed ledger, the second user account associated with the second device, wherein the encrypted data corresponds to a public address corresponding to the second user account, wherein the credential is privately established between the first device and the second device, and wherein redeeming the token transferred to the second user account requires publishing a zero-knowledge proof of the credential to the distributed ledger.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below:

FIGS. 5A-5D, taken together, illustrate an exemplary technique for implementing scrambling and unscrambling keys derived from a credential as digital antennae, constructed and operative in accordance with another embodiment of the invention;

DETAILED DESCRIPTION

Figure 1A:
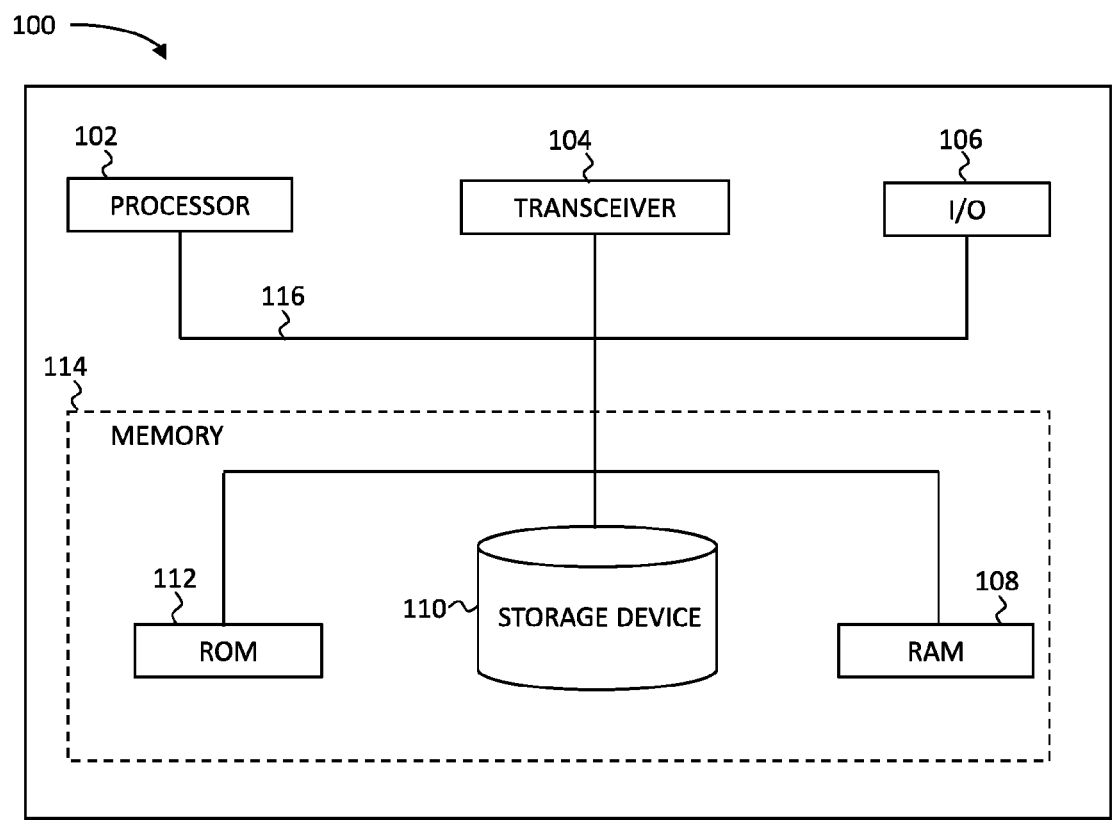
FIG. 1A illustrates a computing device constructed and operative in accordance with an embodiment of the invention.

The invention disclosed herein relates to methods for securing data encrypted with a primary encryption scheme by adding a second encryption layer with a scrambling key. The scrambling key can be derived from any credential. The second encryption scheme exploits the entropy achieved by the primary scheme and is computationally simple as compared to the primary scheme, allowing to distribute the task of encryption. The credential may be independent of existing security information and can be introduced if a party has reason not to trust the primary scheme. Alternatively, the credential may already be in use by one security protocol, and repurposed for a second security protocol, coupling the two protocols together to provide added security in case one of the protocols is circumvented. For example, the credential may be a password used for authentication at the application layer, and may be repurposed to apply a "security patch" to a different security protocol, such as the Transport Layer Security (TLS) to secure a communications channel. If an attacker succeeds in breaching the authentication protocol at the application layer by stealing the hashed password, the data can be protected at the transport layer via the second encryption key derived from the plaintext password. Since the attacker does not have the plaintext password, only the stolen hash, he cannot derive the secondary key needed to decrypt the data. Repurposing the credential has an additional advantage of incurring less overhead in storing and recalling the second encryption key.

In one embodiment, the disclosed invention overcomes some disadvantages of a one-time pad by using a cryptographically strong, one-way hash function on the credential to define a hard-to-guess, pseudo-random permutation $\pi$ and its inverse $\pi^{-1}$ over a group of order n as corresponding scrambling and unscrambling keys. Data (S) encrypted with a primary key K, i.e. $S \rightarrow \{S\}_K$, is mapped onto a group of order n by fragmenting the encrypted data $\{S\}_K$ into n pieces, i.e. $\{S\}_K \rightarrow \{\{S\}_K(0), \{S\}_K(1), \ldots, \{S\}_K(n-1)\}$, such that recovering the encrypted data $\{S\}_K$ so that it can be decrypted, requires reassembling the n pieces in the correct sequence: $\{S\}_K = \{S\}_K(0) | \{S\}_K(1) | \ldots | \{S\}_K(n-1)$. To apply the scrambling key, the permutation $\pi$ is applied to the pieces: $\{S\}_K \rightarrow \pi(\{S\}_K)$ as a security patch. Before decrypting the encrypted data $\{S\}_K$ with the primary key K, the inverse permutation $\pi^{-1}$ must first be applied, i.e. $\pi^{-1}(\pi(\{S\}_K)) \rightarrow \{S\}$ to remove the patch. Since the number of permutations over a group of order n is n!, if the number of pieces n is sufficiently large, guessing the pseudo-random permutation $\pi$ and its inverse $\pi^{-1}$ is not feasible without the credential due to the pseudo-randomness of a one-way hash. By exploiting the chaotic characteristic of a cryptographic hash, a credential of arbitrary length can be used to derive an encryption key for data of any length, with no risk of replication, as would be the case with a one-time pad. Moreover, applying a permutation is computationally cheap relative to conventional, reversible encryption schemes that demand considerable computational resources, enabling a user to exploit the entropy achieved by the primary encryption and add another, independent encryption layer at relatively low cost.

Reference is now made to FIG. 1A which illustrates a computing device, generally referenced 100, constructed and operative in accordance with an embodiment of the invention. Device 100 is representative of any conventional computing device, such as but not limited to, a desktop computer, a mobile phone, a tablet, an Internet of Things (IOT device), a wearable device, a server, and the like. Device 100 includes at least one processor 102, at least one transceiver 104, at least one input/output device (I/O) 106, a random-access memory (RAM) 108, a non-volatile computer readable storage device 110 and a read only memory (ROM) 112, collectively referred to herein as memory 114. Processor 102, transceiver 104, I/O 106, and memory 114 comprising RAM 108, storage device 110, and ROM 112, are electrically coupled via a common bus structure 116.

At least one processor 102 includes one or more central processing units (CPUs), graphical processing units (GPUs), accelerated processing units (APUs) and the like. Transceiver 104 is operative to enable two-way communication between device 100 and additional devices or routers (not shown), such as to send and receive data and computer executable instructions, via wired means, such as electrical or optical cables and wires, and/or wireless means, such as long, medium, or short wave radio communication, including satellite communications, cellular communications, Wifi, BlueTooth, Zigbee, radar, lidar, infrared, microwave technologies, and the like. Transceiver 104 is operative to connect device 100 to a network, such as a local area network (LAN), a wide area network (WAN), or an external network such as the Internet. The network may be implemented in any suitable manner, such as with a client-server architecture or a peer-to-peer architecture. I/O 106 is operative to interface with the environment, such as with a human user of device 100, and includes one or more input and output interfaces, such as, but not limited to, a visual display, an electronic mouse, a keyboard, a touch-based screen, a loud speaker, a microphone, and the like. It will be appreciated that device 100 may operate without human operation and without I/O device 106.

To carry out operations of the present invention, processor 102 is operative to execute one or more instructions relating to data retained in memory 114. RAM 108 may include a static random access memory (SRAM). Storage device 110 may be implemented using known means, such electronic, magnetic, optical, electromagnetic, or semiconductor technologies, or any suitable combination thereof, and may include one or more of a portable disk, a hard disk, a digital versatile disk (DVD), a memory stick, to name but a few. ROM 112 may include one or more of a compact disc read-only memory (CD ROM), an erasable programmable read-only memory (EPROM or Flash memory). Information stored in memory 114 is not to be construed as being transitory signals, such as radio waves, electromagnetic waves, optical pulses, or electrical signals transmitted through a wire.

Although FIG. 1A shows device 100 as a stand-alone device, this for illustrative purposes only. In some implementations, the components of device 100 as illustrated in FIG. 1A are logical or virtual representations of multiple physical components distributed over multiple devices at one or more physical locations, and that operate in a coordinated manner to carry out operations of the present invention, as is known in the art of distributed computing.

Figure 1B:
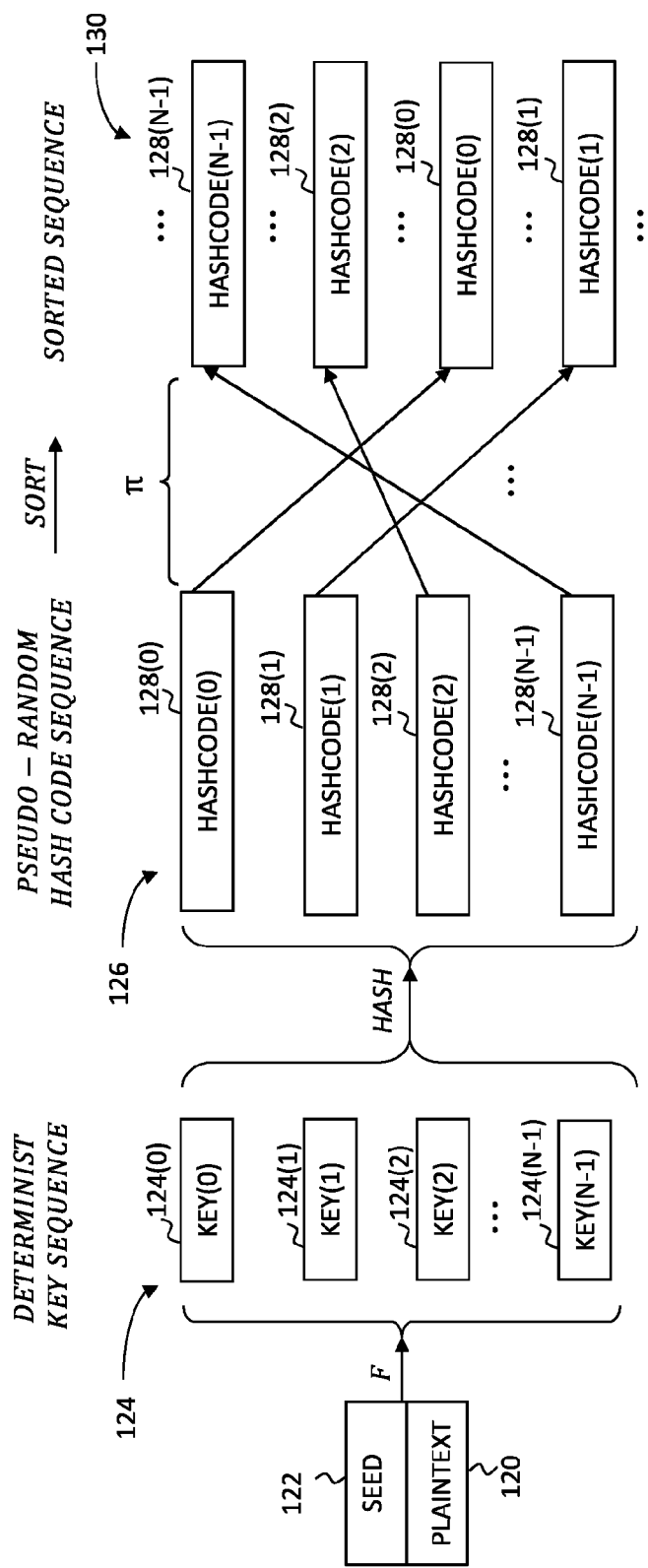
FIG. 1B illustrates a technique for deriving a scrambling key and a corresponding unscrambling key based on a credential, constructed and operative in accordance with an embodiment of the invention.

Reference is now made to FIG. 1B which illustrates a technique for deriving a scrambling key and a corresponding unscrambling key based on a credential, constructed and operative in accordance with an embodiment of the invention. The technique of FIG. 1B is executable by device 100 of FIG. 1A. Processor 102 obtains a credential which includes a plaintext string 120 and a seed 122. In some implementations, processor 102 receives plaintext string 122 from a user via I/O 106, and receives seed 122 via transceiver 104 from an external source, however this is not intended to be limiting. Plaintext string 122 may be defined by the user of device 100, or system-defined depending on context. For example, plaintext string 120 may be derived from one or more of: a password, a passphrase, a message, a contextual query term or label, a device ID, a user ID, tokenized biometric information of a user of device 100, location data, a timestamp, a public address on a distributed ledger, a hash or encrypted version of any of the above, to list but a few possibilities. Seed 122 is a number determined using conventional cryptographic techniques. Alternatively, seed 122 is derived from plaintext string 120 so as not to incur additional overhead for storing and recalling seed 122, e.g. by extracting k bits from plaintext string 120 according to a predefined scheme.

Processor 102 applies a deterministic function (F) to seed 122 to generate a deterministic sequence 124 of N unique keys, i.e. F(seed)=Key(0) . . . Key(N−1), labelled 124(0) . . . 124(N−1), respectively. The function F is any deterministic function that generates n unique values from seed 122, i.e. the function F is preferably injective. For example, F can increment or decrement seed 122 by a constant or variable amount. As another example, F may be selected from $2^k$ candidate functions using the k rightmost or leftmost bits of seed 122 as an index.

Processor 102 applies a cryptographic hash function to plaintext string 120 with each key from key sequence 124(0) . . . 124(N−1), to generate a deterministic, pseudo-random sequence, 126, of unique hash codes 128(0) . . . 128(N−1). Ideally, the hash function has strong pre-image resistance, strong collision-resistance, and an avalanche effect such that the probability of selecting the particular sequence 126 from all the possible N! sequences for hash codes 128(0) . . . 128(N−1) approaches 1/N!. For example, the hash function may be selected from the SHA family of hashes (e.g. SHA-256), the MD family of hashes (e.g. MD5), RIPEMD-320, Whirlpool, to name but a few. In some implementations, the hash function is an HMAC function which generates the pseudo-random sequence 126 of hash codes 128(0) . . . 128(N−1) as N MAC codes from plaintext string 120 and each key 124(0) . . . 124(N−1) of key sequence 124. Due to the chaotic nature of the cryptographic hash function, sequence 126 of N hash codes 128(0) . . . 128(N−1) appears random, however sequence 126 is actually pseudo-random and corresponds to deterministic sequence 124 of keys 124(0) . . . 124(N−1). Thus, pseudo-random sequence 126 can subsequently be reproduced from the credential comprising plaintext string 120 and seed 122.

Processor 102 sorts pseudo-random sequence 126 to produce a sorted sequence 130 of same N hash codes 128(0) . . . 128(N−1). The sorting may be based on any suitable convention, such as an alphanumerical order. Processor 102 maps the pseudo-random sequence 126 to sorted sequence 130 in a bijective mapping to define a permutation π over a group of order N. In one implementation, π is the N:N mapping from the pseudo-random sequence 126 to the sorted sequence 130, i.e. π:PseudoRandom→Sorted, or:

$$\pi = (\text{Hash}(0) \ldots \text{Hash}(N-1)/\pi(\text{Hash}(0)) \ldots \pi(\text{Hash}(N-1)))$$

It follows that the inverse permutation, $\pi^{-1}$ is the inverse N:N mapping from the sorted sequence 130 to the pseudo-random sequence 126, i.e. $\pi^{-1}$: Sorted→PseudoRandom, or:

$$\pi-1 = (\pi(\text{Hash}(0)) \ldots \pi(\text{Hash}(N-1))/\pi-1\pi(\text{Hash}(0)) \ldots \pi-\pi(\text{Hash}(N-1))) = (\pi(\text{Hash}(0)) \ldots \pi(\text{Hash}(N-1))/\text{Hash}(0) \ldots \text{Hash}(N-1))$$

Alternatively, π maps sorted sequence 130 to pseudo-random sequence 130 and $\pi^{-1}$ maps pseudo-random sequence 126 to sorted sequence 130. Processor 102 may store one or more of permutation π, credential 120, seed 122 at memory 114 for subsequent use.

Figure 1C:
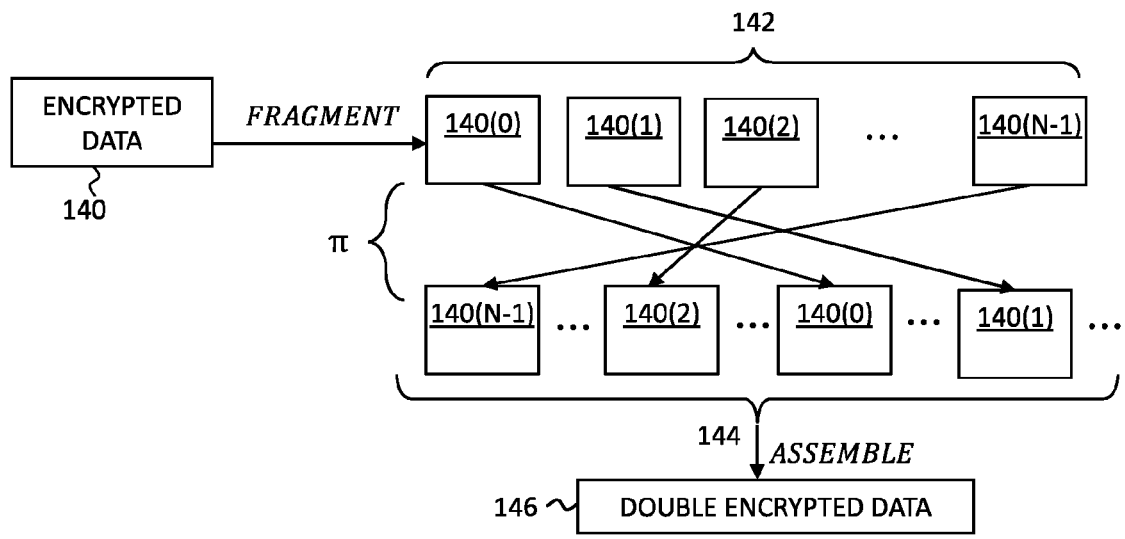
FIG. 1C illustrates a technique for using the scrambling key of FIG. 1B to apply a second, reversible encryption layer to encrypted data, constructed and operative in accordance with an embodiment of the invention.

Reference is now made to FIG. 1C which illustrates a technique for using the scrambling key of FIG. 1B to apply a second, reversible encryption layer to encrypted data, constructed and operative in accordance with an embodiment of the invention. The technique of FIG. 1C is executable by device 100 of FIG. 1A.

Processor 102 obtains encrypted data 140, encrypted with a primary encryption scheme. In some implementations, the primary encryption scheme is reversible and based on a primary key. Examples of key-based reversible encryption schemes include symmetric encryption schemes (e.g. AES), and asymmetric encryption schemes (e.g. RSA or elliptic curve cryptography). In other implementations, the primary encryption scheme is irreversible and may or may not require a key. Examples of irreversible encryption schemes are one-way hash functions (e.g. SHA256), which may optionally use a key as a salt value.

Processor 102 maps encrypted data 140 to a group of order N by fragmenting encrypted data 140 into N pieces 140(0) . . . 140(N-1). Pieces 140(0) . . . 140(N-1) are ordered in a sequence 142, referred to herein as the original sequence 142, such that recovering encrypted data 140 requires assembling or concatenating pieces 140(0) . . . 140(N-1) according to original sequence 142. Processor 102 applies any suitable fragmentation scheme that results in a sufficiently large N such that the number 1/N! is very small, and therefore hard to guess. For example, if N=100, 1/100! is $9.3 \times 10^{-157}$, which is very small. One possible fragmentation scheme is to set the number of pieces (N) as a predefined constant, i.e. the encrypted data is divided into N pieces, regardless of the file size. In this case, the size of the pieces depends on the size of the file, with larger files having larger pieces, and smaller files having smaller pieces. Another possible fragmentation scheme maintains a predefined fixed size for the pieces regardless of the size of the file, i.e. the encrypted file is divided by the fixed size into N pieces, where larger files have more pieces (larger N) and smaller files have fewer pieces (smaller N). The encrypted data may be padded as necessary to comply with the fragmentation scheme.

Processor 102 applies permutation $\pi$ to sequence 142 as the scrambling key, to produce a permutated sequence 144 of the same N encrypted pieces 140(0) . . . 140(N-1), e.g. $\pi(140(0), \ldots, 140(N-1))$. Processor 102 concatenates the N encrypted pieces 140(0) . . . 140(N-1) according to permutated sequence 144, to produce doubly encrypted data 146, encrypted first with the primary scheme and then scrambled with the permutation $\pi$ derived from plaintext string 120 and seed 122. Doubly encrypted data 146 is substantially the same size as encrypted data 144, accounting for padding to comply with the fragmentation scheme, and can be seamlessly integrated into existing protocols. For example, the parity bit of encrypted data 144 and doubly encrypted data 146 is the same if there is no need for padding. However, the entropy of doubly encrypted data 146 is greater owing the increased complexity due to the permutation. Importantly, the increase in entropy is based on plaintext string 120 and seed 122, which are independent of the key for the primary encryption scheme. Processor 102 replaces encrypted data 140 with doubly encrypted data 146, for example, as a payload of a TLS packet, as a block of data within a data stream, as an asymmetrically encrypted message of a handshake protocol, or published on a blockchain as an encrypted public address, to name but a few implementations. Since the permutated version 146 of encrypted data 140 does not require additional memory or channel capacity, this scheme can be integrated into existing protocols. At attacker would have to obtain both the key for the primary encryption and the independent credential for the permutation to access the plaintext data.

In some implementations, processor 102 stores permutation $\pi$ and/or its inverse $\pi^{-1}$ at memory 114 using known techniques to securely storage of encryption keys. In other implementations, processor 102 derives $\pi$ and/or $\pi^{-1}$ on an as needed basis from plaintext string 120 and seed 122. In some implementations, plaintext string 120 is already stored by device 100 for other applications. For example, plaintext string 120 may be derived from data that is inherent to device 100, such as a device ID, or location information. In some implementations, plaintext string 120 is derived from data that is inherent to a user of device 100, such as biometric information, or a user ID. In some implementations, a user enters plaintext string 100 via I/O 106, for example, as a password or passphrase, or via a dongle.

Figure 1D:
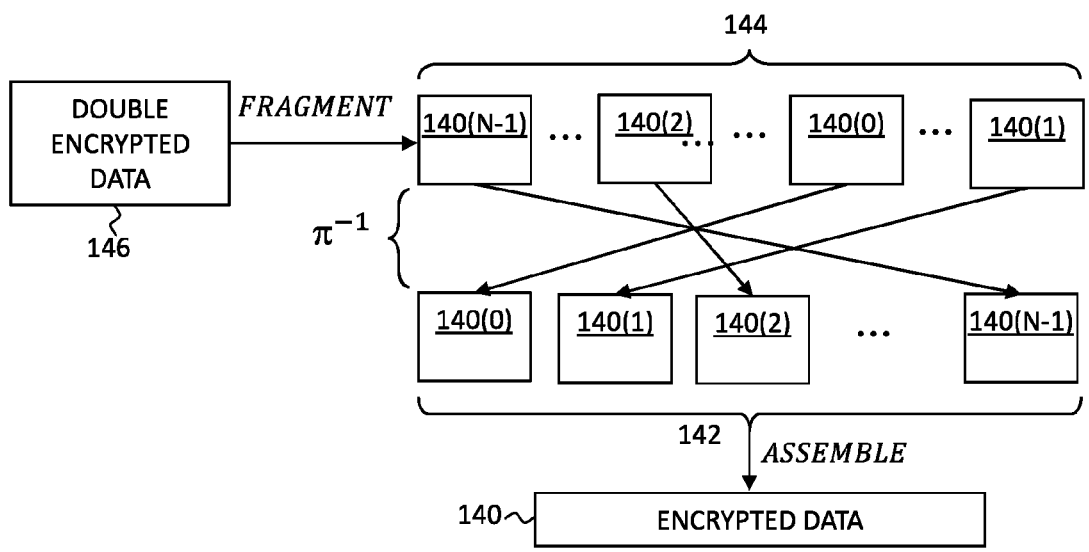
FIG. 1D illustrates a technique for using the unscrambling key of FIG. 1B to remove the second, reversible encryption layer of FIG. 1C, constructed and operative in accordance with an embodiment of the invention.

Reference is now made to FIG. 1D which illustrates a technique for using the unscrambling key of FIG. 1B to remove the second, reversible encryption layer of FIG. 1C, constructed and operative in accordance with an embodiment of the invention. To recover encrypted data 140, processor 102 obtains doubly encrypted data 146, such as from memory 114 and/or via transceiver 104. Processor 102 maps doubly encrypted data 146 to a group of order N by fragmenting doubly encrypted data 146 into N pieces according to the fragmentation scheme used above with reference to FIG. 1C, with the notable difference that now, the N encrypted pieces are ordered according to the permutated sequence 144 as opposed to the original sequence 142. Processor 102 obtains the inverse permutation $\pi^{-1}$, such as from memory 114, or by deriving $\pi^{-1}$ from the credential including plaintext string 120 and seed 122 as described above. Processor 102 applies the inverse permutation $\pi^{-1}$ to the N encrypted pieces and restores their original sequence 142 for encrypted pieces 140(0) . . . 140(N-1), e.g. $\pi^{-1}\pi(140(0), \ldots, 140(N-1))=140(0), \ldots, 140(N-1)$. Processor 102 reassembles encrypted pieces 140(0) . . . 140(N-1) according to original sequence 142, to recover encrypted data 140.

Processor 102 uses encrypted data 140 as needed. If encrypted data 140 was reversibly encrypted, processor 102 decrypts encrypted data 140 using the primary key to obtain cleartext data. Alternatively, if encrypted data 140 is a digest or hash code produced from a one-way function, processor 102 uses encrypted data 140 as necessary, such as for authentication, digitally signing, as a zero-knowledge proof (ZKP), and the like.

It is to be appreciated that without knowledge of the credential, i.e. plaintext string 120 and seed 122, correctly guessing permutation $\pi$ from all the possible N! permutations is difficult, even for relatively small values of N due to the factorial order of complexity. However, deriving permutation $\pi$ from plaintext string 120 and seed 122 is relatively simple, incurring a cost of order N log N, as follows: an order of N steps are needed to compute keys 124(0) . . . 124(N-1), and hash codes 128(0) . . . 128(N-1), an order of N log N steps are needed to sort pseudo-random sequence 126, from which permutations $\pi$ and $\pi^{-1}$ are determined, and an order of n step are needed fragment the data and apply $\pi$ and $\pi^{-1}$, leading to an upper-bound of N log N. Thus, a relatively small N can produce a cryptographically strong reversible function (1/N!) for comparatively low cost (N log N), allowing one to distribute the encryption of data over multiple devices. A device with dedicated hardware that is capable of performing computationally heavy tasks efficiently can apply a block cipher encryption as the first encryption layer to data, i.e. to produce encrypted data 140 from cleartext data. A second device with simpler hardware can apply a permutation derived from a credential to produce doubly encrypted data 146. If the credential (e.g. plaintext string 120 and seed 122) is based on a secret that is independent of the first encryption layer, the technique grants the second device control over the doubly encrypted data without incurring the computational overhead of applying a strong encryption algorithm to data.

Figure 2:
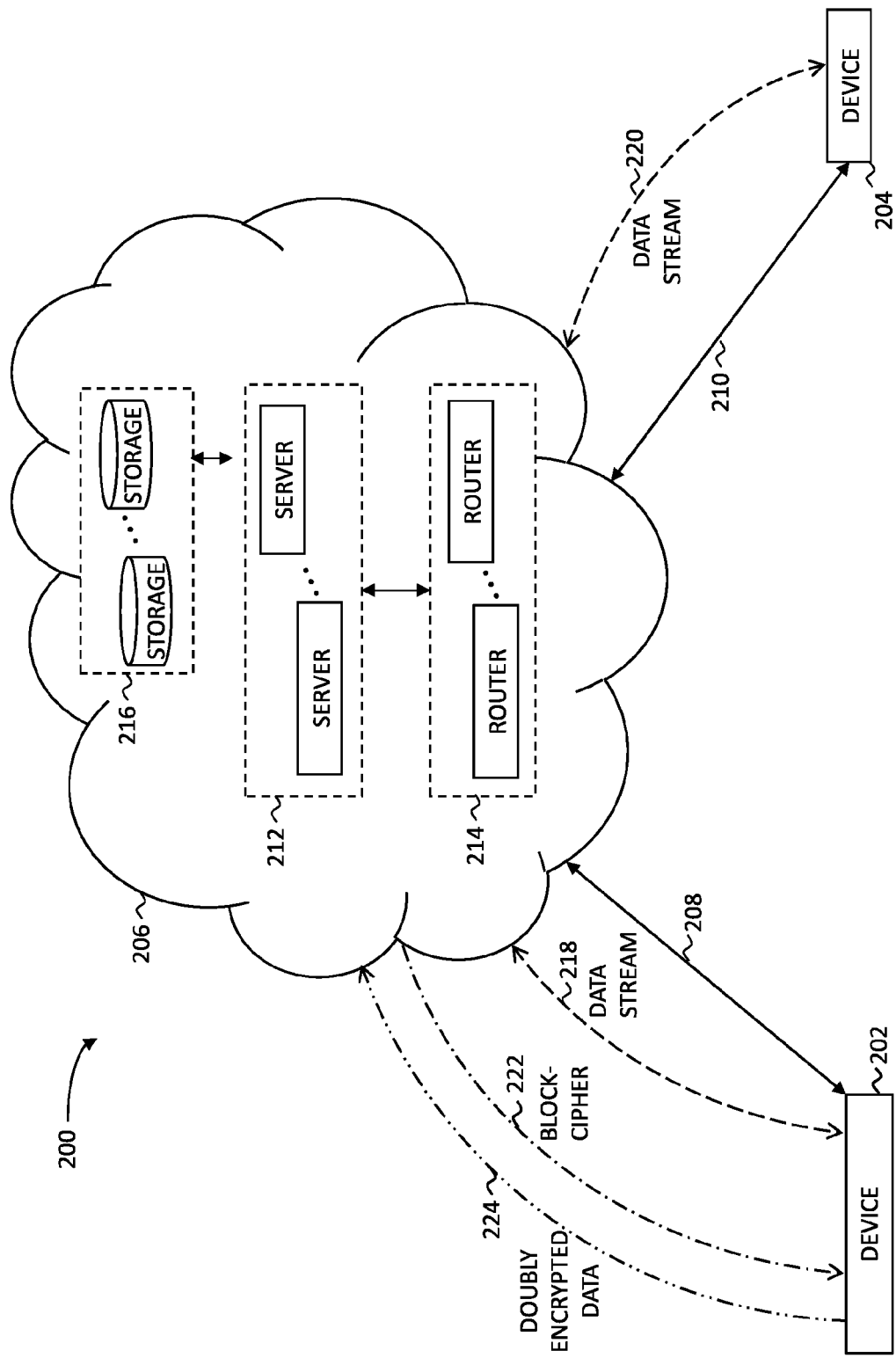
FIG. 2 illustrates an exemplary implementation for the scrambling and unscrambling keys of FIGS. 1B-1D to distribute the task of encryption over multiple devices, constructed and operative in accordance with another embodiment of the invention.

Reference is now made to FIG. 2 which illustrates an exemplary implementation for the scrambling and unscrambling keys of FIGS. 1B-1D to distribute the task of encryption over multiple devices, constructed and operative in accordance with an embodiment of the invention. FIG. 2 illustrates a system 200 including a first device 202 and a second device 204 communicating via a computer service 206 over physical channels 208 and 210, respectively. Physical channels 208 and 210 are conventional communications channels implemented using any combination of wired or wireless means, including electrical or optical cables, long, medium, and short radio waves, including satellite, cellular, Wifi, BlueTooth, Zigbee, laser, lidar, infrared, microwave technologies, and the like. Optionally, each of devices 202 and 204 establish a security protocol, such as the TLS protocol, with computer service 206 over channels 208 and 210, respectively. Computer service 206 includes at least one server 212, at least one router 214, and at least one storage device 216. At least one server 212, and devices 202 and 204 are computing devices, generally represented by device 100 of FIG. 1A. At least one server 212 is communicatively coupled to at least one router 214 and at least one storage device 216 using known communications techniques, such as any combination of the wired and wireless means listed above. Server 212 is operative to transmit and receive data to and from devices 202 and 204 via router 214, and to store and retrieve data to and from storage device 216. Dashed arrows 218, 220, 222, and 224 indicate logical data flows over physical channels 208 and 210.

Server 212 is provided with one or more processors that are suited and dedicated for computationally heavy tasks, such as block cipher encryption. Server 212 is additionally provided with ample RAM storage, as well as multiple non-persistent memory buffers (not shown), for storing data temporarily while performing computational heavy tasks. Devices 202 and 204 are conventional client-end devices, such as IoT camera devices, running on standard processors for which block cipher encryption of large files, i.e. video files of 50 Gigabytes, would hinder the ability of these devices to continue their conventional operation of recording and rendering videos. Computer service 206 offers network capability to physically connect devices 202 and 204 over channels 208 and 210 via routers 214, computation services via server 212, and archiving services by storage devices 216.

The users of devices 202 and 204 exchange a large quantity of sensitive data via computer service 206 over physical channels 208 and 210, labelled 'data stream' and indicated by the two-way dashed arrows 218, and 220, respectively. The sensitive data may include video session recordings between users of device 202 and 204, images, text files and the like. The user of device 202 wishes to save these files at storage devices 216 for future reference and benefit from the reliable archiving technology, while retaining exclusive control of the data due to its sensitive nature.

One option is for device 202 to encrypt the cleartext data received via computer service 206 with a block cipher and secret key that is known only to device 202, and upload the encrypted files to storage device 216 for archiving. However, device 202 lacks the computational resources to apply block cipher encryption efficiently to large files, and this approach will impair the performance of device 202 for its designated task of recording and rendering video. Alternatively, since server 212 has ample computational resources, server 212 may encrypt the data and store the encrypted files at storage device 216 for archiving. However, this grants server 212 access to the sensitive data, and risks exposing the data if computer service 206 is breached. The technique described above can be used to distribute the encryption of the data by allocating the computationally heavy block cipher encryption to server 212, while allocating to device 202 a final scrambling step based on secret that is unknown to server 212. Device 202 then stores the doubly encrypted data at storage device 216, granting the user of device 202 exclusive control of the data, while benefiting from the computational power of server 212, and archiving capability of storage device 216. An exemplary technique is described as follows:

While the video data is streamed to devices 202 and 204 via routers 214 over channels 208 and 212 (i.e. data streams 218 and 220), server 212 encrypts the data in real time with a block cipher and key using the multiple memory buffers in a round-robin rotation in accordance with conventional techniques, to regularly overwrite the contents of the buffers as the encrypted data is transmitted to device 202, indicated by dashed arrow 222. At no time does server 212 retain cleartext data of the video session in persistent memory. Nor does server 212 retain the encrypted data in persistent memory. Once a block of data has been encrypted at server 212 using the buffers and the encrypted block is sent to device 202 over channel 208, the buffers are overwritten to encrypt the next block.

By the end of the session, device 202 has received a block-cipher encrypted recording of the session from server 212. Device 202 obtains a credential comprising a plaintext string and a random seed, as described above. Device 202 applies the credential to derive a permutation and applies the permutation to the encrypted data as a second encryption layer. Device 202 uploads the doubly encrypted data via channel 208 for archiving at storage device 216, indicated by dashed arrow 224. Without the credential, the data cannot be decrypted.

The disclosed invention allows the user to benefit from the reliable storage service and the superior processing power provided by computer service 206, while retaining exclusive control of the data. The computational overhead for adding the second encryption layer by device 202 is considerably smaller than for applying a block cipher encryption. Consequently, encrypting the data using this technique should not interfere with the regular operation of device 202. The fragmentation technique described in U.S. Pat. No. 10,097,522 B2 may additionally or alternatively be used in this context. In this case, each fragment of encrypted data is stored at computer service 206 as a separate file, indexed by a different hash code derived from the plaintext secret.

The invention disclosed herein may be additionally applied to couple the security of multiple layers of a communications protocol. Typically, adding another layer of security requires introducing a new credential, which imposes overhead for storing and recalling the credential. The system and method described below repurposes a credential from one security protocol to add security to another protocol. The implementation described below relates to a PtH attack where an attacker has stolen a victim's hashed credential, but does not have the corresponding plaintext. However, this is often sufficient for logging into the victim's account. Since the transport layer security is independent of the application layer security, once falsely authenticated, the attacker establishes a secure TLS channel to access the victim's data. The disclosure below describes a technique to add a security patch to the transport layer by repurposing a plaintext credential, already in use at the application layer. This way, merely stealing a hashed credential does not grant the attacker access to the victim's data.

Figure 3:
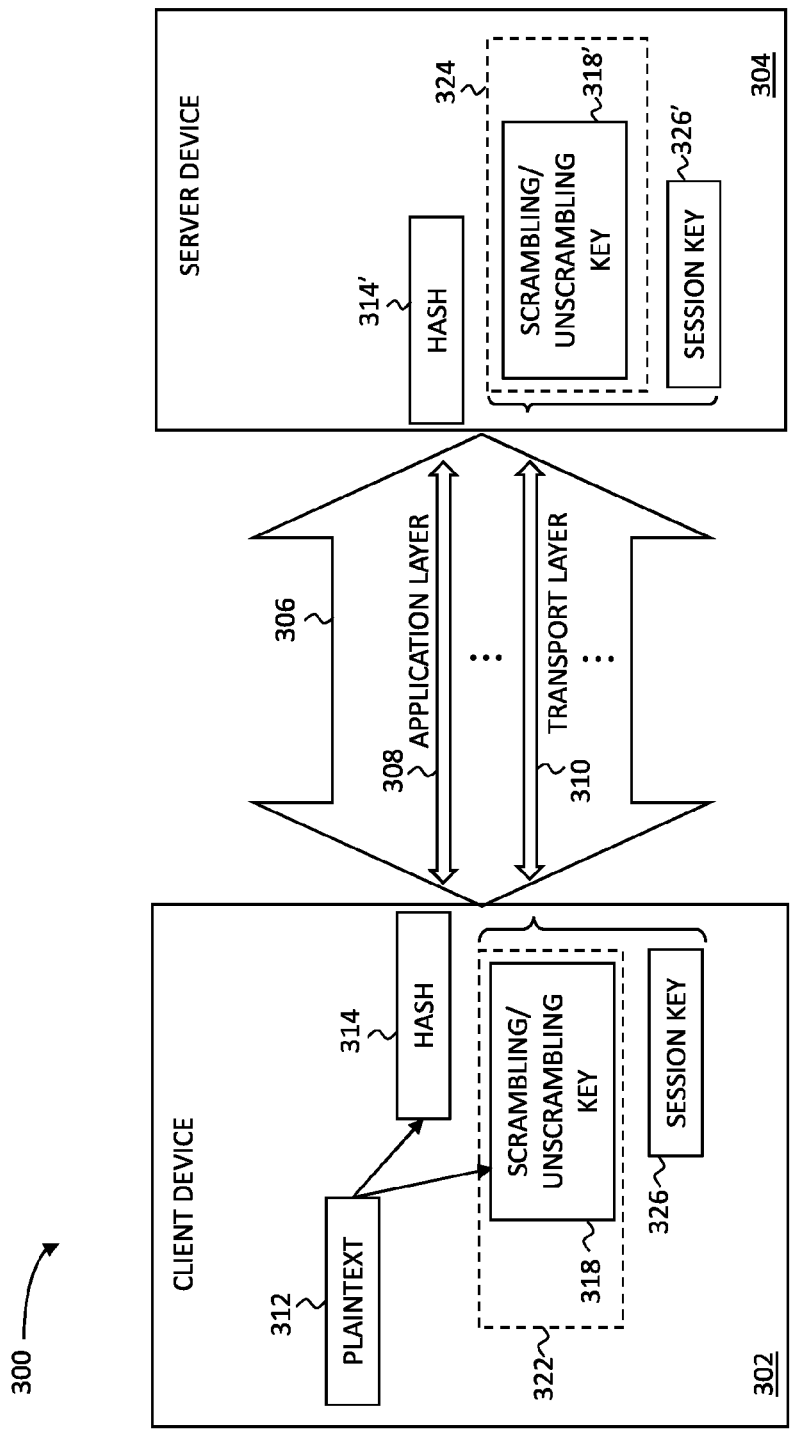
FIG. 3 illustrates an exemplary implementation for the scrambling and unscrambling keys of FIGS. 1B-1D to couple the security of multiple layers of a communications protocol, constructed and operative in accordance with another embodiment of the invention.

Reference is now made to FIG. 3 which illustrates an exemplary implementation 300 for the scrambling and unscrambling keys of FIGS. 1B-1D to couple the security of multiple layers of a communications protocol, constructed and operative in accordance with another embodiment of the invention. FIG. 3 illustrates a system 300 including a device 302 and a server 304 communicating over physical channel 306. Device 302 and server 304 are generally represented by device 100 of FIG. 1A. Physical channel 306 includes multiple logical layers, such as an application layer 308 and a transport layer 310. Application layer 308 handles user interface data, such as a login credential relating to authenticating the user of device 302 to server 304. Transport layer 310 handles communication relating to TLS, such as to establish a unique session key, between device 302 and server 304 after the user of device 302 has been authenticated.

A plaintext string 312 and corresponding seed (not shown) are defined when establishing an account with server 300 for authentication purposes. Plaintext string 312 may be user-defined or device defined, as described above with respect to FIGS. 1B-1D. Device 302 calculates a hashed credential 314 from plaintext 312 and provides server 304 with a copy, labelled 314'. For the purpose of clarity, for multiple copies of the same data, the copy stored at device 302 is labelled with a number, e.g. hashed credential 314, and the copy stored at server 304 has an added quote, e.g. hashed credential 314'. Server 304 stores hashed credential 314' in association with application layer 308. Hashed credential 314 is subsequently used for authentication at application layer 308 in accordance with conventional techniques.

In addition, plaintext 312 is repurposed to generate a symmetric scrambling/unscrambling key 318 with the seed, for example according to the technique of FIGS. 1B-1D, as a permutation of order N and its inverse. One copy of the scrambling/unscrambling key 318 is stored at device 302 and another at server 304, e.g. key 318'. Key 318 is preferably stored separate from application layer 308, such as at secure enclaves 322 and 324, respectively, reserved for transport layer 310. The computation of key 318 may be performed either at device 302 and/or server 304, or distributed there between. Key 318 is subsequently used to apply a second symmetric encryption layer at transport layer 310, coupling the authentication security of application layer 308 to the TLS security of transport layer 310. Thus, plaintext 312 plays two security roles: the first to derive hashed credential 314 for authentication at application layer 308, and which is a relatively passive role; the second is to derive scrambling/unscrambling key 318 to actively apply a second encryption layer to the packets at transport layer 310, over the TLS protocol, thereby enforcing application layer authentication throughout the communication session at the transport layer. Repurposing plaintext 312 to derive scrambling/unscrambling key 318 has another advantage of not imposing additional overhead to store and recall additional security credentials.

After the user of device 302 logs into server 304 over application layer 308 using hashed credential 314, device 302 and server 304 establish a unique session key 326 over transport layer 310, in keeping with conventional techniques. Prior to sending a packet, the data is encrypted with session key 326 as before, and additionally with key 318, to scramble the encrypted data, such that decrypting the data with session key 326 requires first unscrambling the encrypted data with key 318. If an attacker steals hashed credential 314, logs in at application layer 308, establishing a unique session key with server 304 over transport layer 310 is not sufficient to access the user's data. since the attacker cannot obtain scrambling key 318 from hashed credential 314. Thus, circumventing the authentication security at application layer 308 does not results in a privacy breach. A challenge-response imposed between server 304 and device 302 at each login attempt could detect if the hashed credential was stolen and raise an alert, for example by using key 318 at login. To enable login from non-personal devices that do not have key 318, communication may be routed through device 302 that has key 318 to enforce authentication based on plaintext 312 throughout the communication session. Optionally, the communication may be routed just for login if device 302 has low bandwidth capacity. For example, a user may login to her personal account using a computer at a public library, but route the communication through her mobile phone, which has a copy of key 318. Notably, applying key 318 is computationally simple relative to block cipher encryption, and therefore should not introduce significant overhead. The increase in security relies on the independence of between plaintext 312 and unique session key 326.

In some attacks, the attacker steals device 302 and therefore has key 318. However, he would not be able to leverage the unauthorized access to escalate the attack without also stealing the corresponding scrambling/unscrambling keys. Additional or other protocol may be similarly be coupled by repurposing credentials used by one layer for another layer.

In some embodiments, device 302 does not store scrambling/unscrambling key 318' in between sessions, but rather derives scrambling/unscrambling key 318' each time the user of device 302 logs in. For example, server 304 may store only one piece of the credential (i.e. the seed) and receive the other piece from device 302 at login (i.e. plaintext 312) using known cryptographic techniques, such as by padding with a predetermined value and/or encrypting with a public key of server 304. Server 304 computes key 318' on an as-needed basis based on plaintext 312 received from device 302, and the seed stored on server 304 (i.e. the same seed established earlier), and discards plaintext 312 after computing key 318'. Similarly, server discards key 318' at the end of the session. In one implementation, the plaintext for key 318 is independent of the login credential (i.e. hash 314) for application layer 308. For example, the plaintext may be based on a device ID of device 302 to enable a user to login with hashed credential 314 from device 302. In one implementation, the permutation inherent to key 318 is stored at server 304 based on hash pointers that are computed using a salt established with device 302. Server 304 discards the salt in between sessions. To initiate a session, device 302 sends device 304 the salt. Consequently, to conduct a system-wide breach, in addition to stealing each hashed credential 314' and key 318' from server 304, the attacker would also have to obtain the salt corresponding to each stolen key 318' from each user, as these are not stored on server 304. Although the technique above is described with respect to a client server architecture, it is equally applicable to other architectures, such as peer to peer.

In some contexts, the encrypted data is sufficiently small that, rather than derive and apply a permutation form a hashed credential, the hashed credential can be used as a one-time pad to add another, independent layer of security. For example, this could enhance the security of systems employing PKI. Since the size of asymmetrically encrypted data is bound by the size of the asymmetric key, which can be comparable to a hash code, a hash code may be used as a symmetric "patch" over asymmetrically encrypted data to increase the entropy. This may not be applicable to all applications for PKI, however in some contexts, a shared credential is already in place that can be repurposed to add the second encryption layer. In other contexts, parties can establish an independent credential to apply a security patch to data encrypted via PKI.

Figure 4:
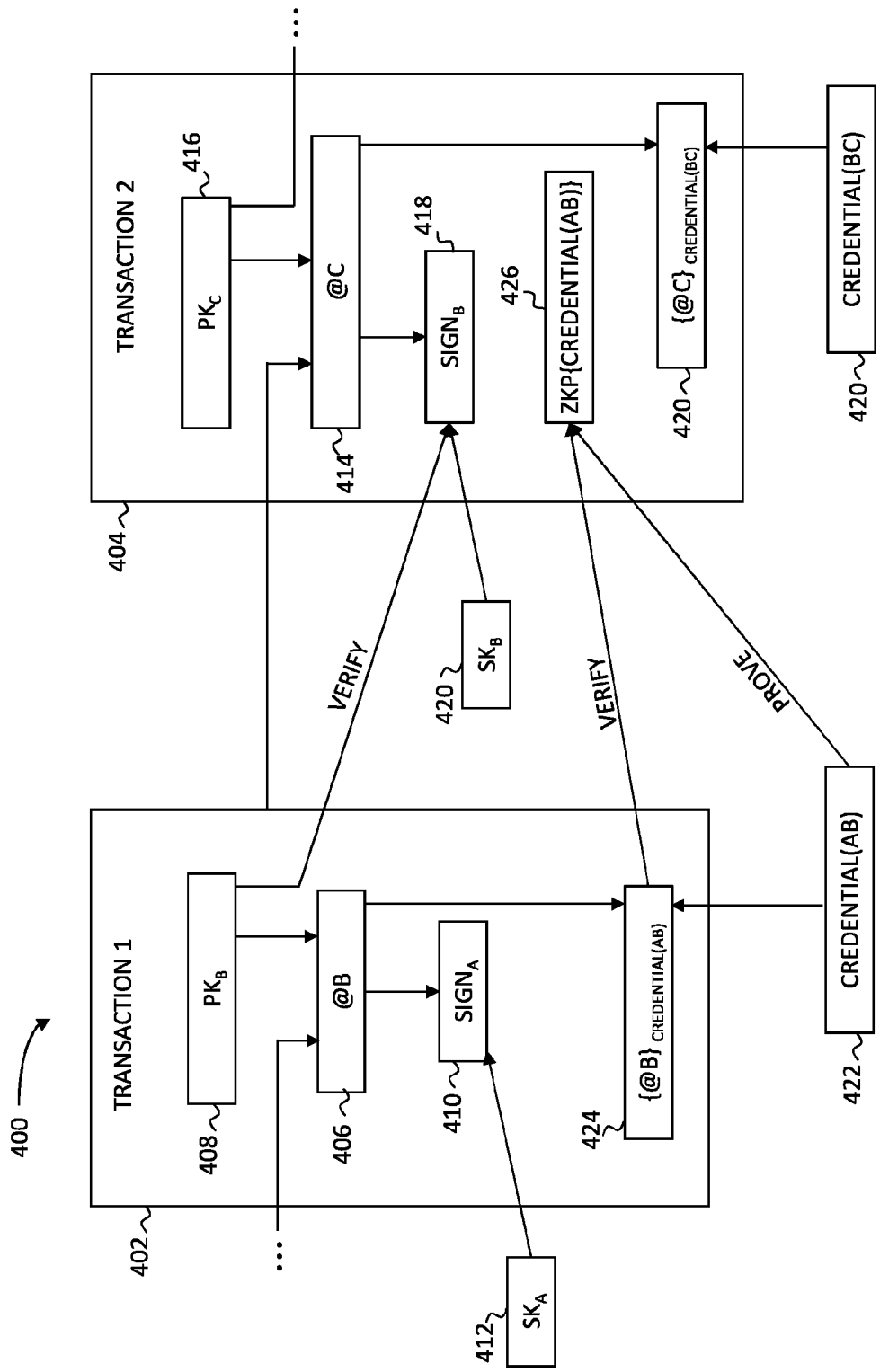
FIG. 4 illustrates an exemplary implementation for securing a transaction over a distributed ledger technology using an independent credential, constructed and operative with another embodiment of the invention.

Reference is now made to FIG. 4, which illustrates an exemplary implementation for securing a transaction over a distributed ledger technology using an independent credential, constructed and operative with another embodiment of the invention. FIG. 4 illustrates an implementation for transferring tokens on a distributed ledger technology (DLT) 400, such as a "blockchain". DLT 400 is implemented over a computer network connecting multiple devices, or "nodes", such as multiple instances of device 100 of FIG. 1A, as known in the art of distributed computing. The nodes of DLT 400 use PKI to verify transactions. Transactions 402 and 404 record the transfer of a token from a party A to a party B, and from a party B to a party C, respectively. In keeping with conventional techniques, to implement transaction 402, party A credits a public address 406 of party B with the token, where public address 406 corresponds to a public key 408 of party B. Party A digitally signs the transfer of the token to party B, indicated by digital signature 410, using a private key 412 corresponding to the public key of party A (not shown). This is to ensure that party A approves the transfer of the token to party B. Subsequently, to transfer the token to party C, party B credits a public address 414 of party C with the token, where public address 414 corresponds to a public key 416 of party C. Party B signs the transfer with a digital signature 418 based on a private key 420 of party B, corresponding to public key 408 of party B. To add transaction 404 to DLT 400, the nodes of DLT 400 must verify that digital signature 418 corresponds to public key 408 and public address 406 of party B, certifying that the redeemer of the token is party B, who is the sole possessor of private key 420.

However, if an attacker steals private key 420 of party B, the attacker can transfer the token to the attacker's public address by forging digital signature 418. This might happen if the attacker has a powerful computer that can resolve private key 420 from public key 408, or if the attacker succeeds in stealing private key 420 from a "hot wallet". Alternatively, the attacker may succeed in compromising the certificate authority issuing public-private key pair 408 and 420 to party B.

To address this vulnerability, before recording transaction 402 on DLT 400, parties A and B privately establish a secret credential 422 that is independent of the PKI. For example, credential 422 may be based on a contextual term that is relevant to parties A and B, biometric data, a device ID, and the like. Optionally, credential 422 is derived via a Diffie Helman-type protocol to ensure confidentiality, and is negotiated via a smart contract over DLT 400 to ensure mutual agreement. Party A uses secret credential 422 to encrypt public address 406 of party B to produce encrypted public address 424, i.e. $@(B) \rightarrow \{@(B)\}_{CREDENTIAL(AB)}$. For example, secret credential 422, or a hash thereof, may be applied as a one-time pad to public address 406 to produce encrypted public address 424. Alternatively, party A derives a scrambling key from secret credential 422 as described above.

Owner A publishes encrypted public address 424 with transaction 402, crediting encrypted public address 424 of party B with the token. Optionally, B digitally signs transaction 402 to verify agreement. To transfer the token to owner C, in addition to providing digital signature 418, owner B publishes a zero-knowledge proof (ZKP) 426 for secret credential 422. Before adding transaction 404 to DLT 400, in addition to verifying digital signature 418 with public key 408, the nodes of DLT 400 also verify ZKP 426 with encrypted public address 424. Only after both digital signature 418 and ZKP 426 are verified, do the nodes add transaction 404 to DLT 400. The verifying node may charge a premium fee for this service.

In some embodiments, credential 422 is a cleartext string, and public address 406 is encrypted by adding a one-time pad derived from credential 422. To avoid publishing credential 422 as ZKP 426, which would allow guessing subsequent credentials, credential 422 is hashed twice to produce a first hash, and a second hash. Party A uses the second hash as the one-time pad for public address 406, and party B publishes the first hash as ZKP 426. The nodes maintaining DLT 400 can easily compute the second hash from ZKP 426 to verify encrypted public address 424, thereby verifying ZKP 426 and authenticating transaction 404 independent of the PKI.

The techniques described produce doubly encrypted data that is substantially the same size as the original encrypted data, taking into account any necessary padding for the fragmentation scheme, allowing to integrate the technique with existing protocols. However, a third party can learn something about encrypted data due to its size. For example, one can assume that a 5 Gigabyte file is probably a video file, whereas a 100 Kilobyte file is probably text. Once the file type is known, additional information can be learned about the data, e.g. the most significant bit of an ASCII character is zero. A technique for masking the size of a file is described in U.S. Pat. No. 10,097,522 B2, which fragments data into pieces for static storage. The technique described below extends the idea of data fragmentation to dynamic transmission, effectively using a credential as a digital antenna to disperse encrypted data into pieces for transmission over a channel, and subsequently collect, and correctly reassemble the pieces to recover the encrypted data at the receiving side of the channel.

Figure 5B:
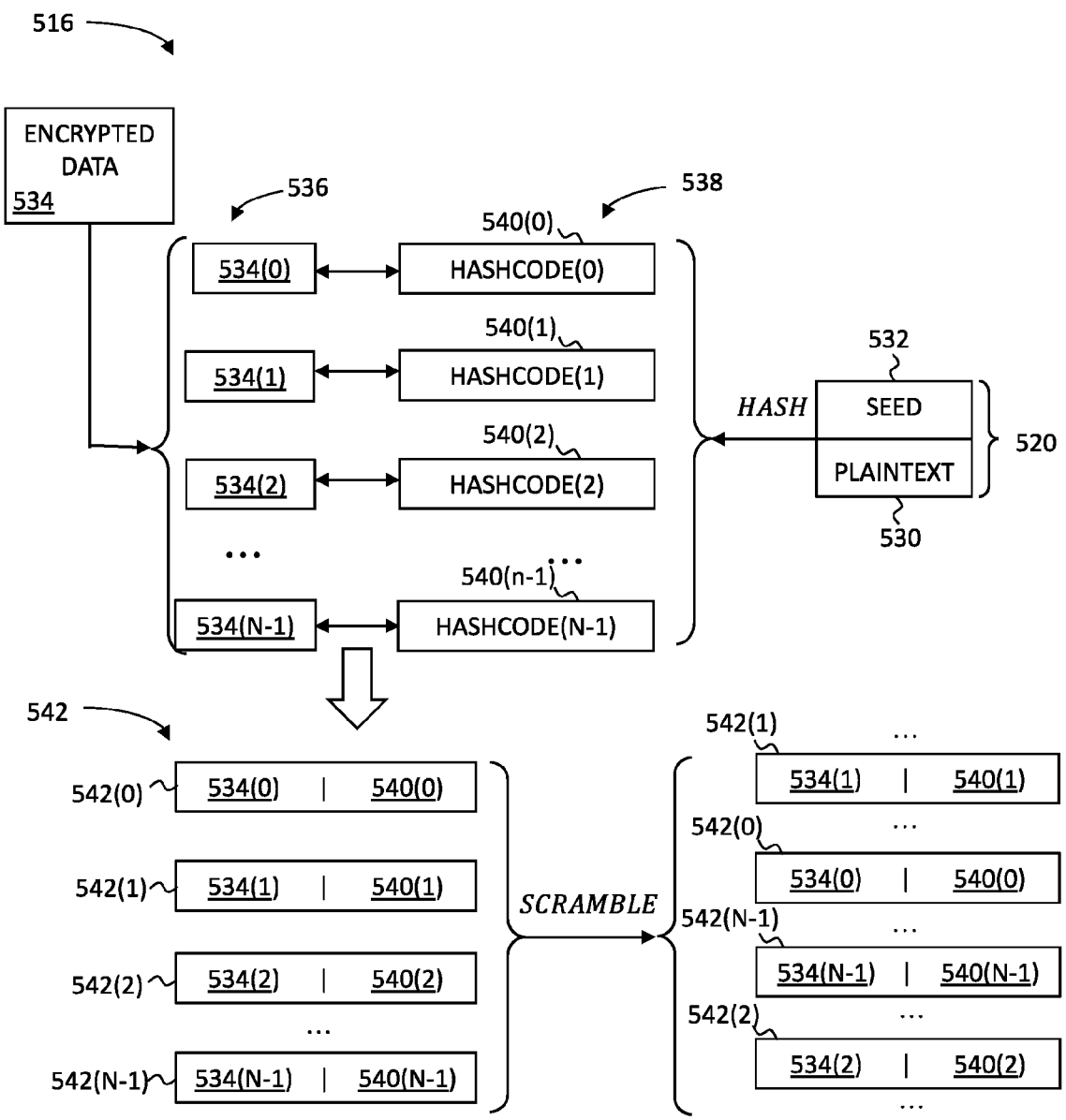

Reference is now made to FIGS. 5A-5D, which, taken together, illustrate an exemplary technique for implementing scrambling and unscrambling keys derived from a credential as digital antennae, constructed and operative in accordance with another embodiment of the invention. Referring to FIG. 5A, a system 500 includes a first device 502 and a second device 504 communicating over a communications network 506 via physical channels 508 and 510, respectively. First device 502 and second device 504 are generally represented by device 100 of FIG. 1A. Network 506 is a communications network implemented using conventional techniques, such as a local area network (LAN), a wide area network (WAN), or an external network such as the Internet. Channels 508 and 510 are conventional communication channels. It is to be noted that the following technique may be applied to non-networked communications as well, such as a devoted channel connecting devices 502 and 504. First device 502 and second device 504 transmit and receive multiple encrypted data packets, collectively referenced 512, via digital antennae 516 and 518. Digital antennae 516 and 518 are based on one or more credentials 520, which are used to derive a scrambling key 522 and corresponding unscrambling key 524.

To create digital antennae 516 and 518, devices 502 and 504 share credential 520. For example, devices 502 and 504 may negotiate credential 520 over a secure channel 526 that is independent of network 506, such as a short messaging service (SMS). Optionally, devices 502 and 504 negotiate credential 520 using a Diffie Hellman protocol to ensure confidentiality. Credential 520 may be originated by any one of or both of devices 502 and 504. Although the following description relates to device 502 as a data transmitter (FIG. 5B) and device 504 as a data receiver (FIG. 5C), this is for exemplary purposes only, and it is to be understood that each of devices 502 and 504 can implement the techniques described below to both transmit and receive data to allow for two-way communication.

Referring to FIG. 5B, a technique for creating digital transmitter 516 from credential 520 is shown, constructed and operative in accordance with an embodiment of the invention. Credential 520 includes a plaintext 530 and a seed 532. Plaintext 530 can be any string of characters, such as plaintext 120 of FIG. 1B. Seed 532 is a random or pseudo-random number such as seed 122.

Device 502 obtains encrypted data 534, and maps it to a group of order N by fragmenting encrypted data 534 into N pieces (534(0) . . . 534(N-1)) as described above for FIG. 1D. Pieces 534(0) . . . 534(N-1) are arranged according to original sequence 536 such that recovering encrypted data 534 requires reassembling pieces 534(0) . . . 534(N-1) according to original sequence 536. The number N may optionally be appended to credential 520. Device 502 applies any suitable fragmentation scheme that results in a sufficiently large N such that guessing original sequence 536 from the 1/N! possibilities is difficult.

Device 502 uses seed 532 to derive a deterministic sequence of N keys, such as keys 124(0) . . . 124(n-1) of FIG. 1B. Device 502 applies a cryptographic hash function to plaintext 530 and each of the N keys to produce a pseudo-random sequence 538 of N hash codes, 540(0) . . . 540(N-1), such as by using an HMAC function. Pseudo-random sequence 538 corresponds to the deterministic sequence of the N keys derived from seed 532, just as pseudo-random sequence 126 corresponds to deterministic sequence 124 in FIG. 1B. In other words, pseudo-random sequence 538 is the sequence by which hash codes 540(0) . . . 540(N-1) are derived from plaintext 530 and seed 532, and is unique from the N! possible sequences for arranging hash codes 540(0) . . . 540(N-1).

Device 502 associates original sequence 536 for the N encrypted pieces 534(0) . . . 534(N-1) with pseudo-random sequence 538 for N hash codes 540(0) . . . 540(N-1), and which corresponds to the deterministic sequence of keys derived from seed 532. Device 502 maps each of the N encrypted pieces 534(0) . . . 534(N-1), ordered according to original sequence 536, to one of the N hash codes 540(0) . . . 540(N-1), ordered according to pseudo-random sequence 538, in a one-to-one correspondence. Thus, piece 534(0) is mapped to hash code 540(0) derived from the first key derived from seed 532, piece 534(1) is mapped to hash code 540(1) derived from the second key derived from seed 532, and so on. Reassembling N encrypted pieces 534(0) . . . 534(N-1) according to pseudo-random sequence 538, derivable from credential 520, recovers encrypted data 534. This means that if encrypted pieces 534(0) . . . 534(N-1) are scrambled, then credential 520 can be used to arrange them according to original sequence 536 to unscrambles them.

Device 502 combines each of encrypted pieces 534(0) . . . 534(N-1) with the associated hash code 540(0) . . . 540(N-1) to create a set of N packets 542, labelled as individual packets 542(0) . . . 542(N-1), i.e. the first piece 534(0) of encrypted data 534 is combined with the first hash code 540(0) derived from the first key generated from seed 532 to create packet 542(0), the second piece 534(1) of encrypted data 534 is combined with the second hash code 540(1) derived from the second key generated from seed 532 to create packet 542(1), and so on. For each packet 542(i), i=0 to n-1, encrypted piece 534(i) forms the packet payload, and hash code 540(i) forms the packet header.

Device 502 scrambles packets 542 such that recombining pieces 534(0) . . . 534(N-1) from packets 542 requires knowing original sequence 536 corresponding to pseudo-random sequence 538. Device 502 may scramble packets 542 in any manner, such as randomly or pseudo-randomly. Device 502 transmits scrambled packets 542 to device 504 over channels 508 and 510 and network 506. Optionally packets 542 are transmitted interspersed with noise packets and other data packets that appear indistinguishable from packets 542. The noise packets are constructed to be unique, for example by computing a hash of a discarded message packet, or old noise packet. Device 502 may send several encrypted files in parallel using the technique described herein, each dispersed into multiple packets, and add noise packets such that all the packets indistinguishable from each other. A third party would have no way of knowing which packets pertain to encrypted data 534, nor the sequence for combining any packets to construct a decipherable file. In some embodiments, prior to, and after transmitting packets 542, device 502 continuously floods channels 508 and 510 with noise packets such that the level of traffic between devices 502 and 504 202 is substantially constant before, during, and after communication. Consequently, a third party cannot detect if and when devices 502 and 504 are communicating, nor how much data is exchanged.

For example, FIG. 5A shows a traffic flow of packets 512 that includes packets 542(0), 542(1), 542(2) and 542(3) interspersed with other indistinguishable pieces of data and noise. Packets 542(0), 542(1), 542(2) and 542(3) are highlighted in bold for exemplary purposes only. The forming of packets 542 and the subsequent scrambling of packets 542, and optional embedding of packets 542 in a flow of similar-looking pieces of data, corresponds to scrambling key 522 of FIG. 5A.

Consequently, device 502 uses credential 520 to build digital transmitter 516 (FIG. 5A) for dispersing data 534 into the other traffic 512 on channel 508, where hash codes 550(0) . . . 550(n-1) function as a digital carrying frequency defined by credential 520.

Figure 5C:
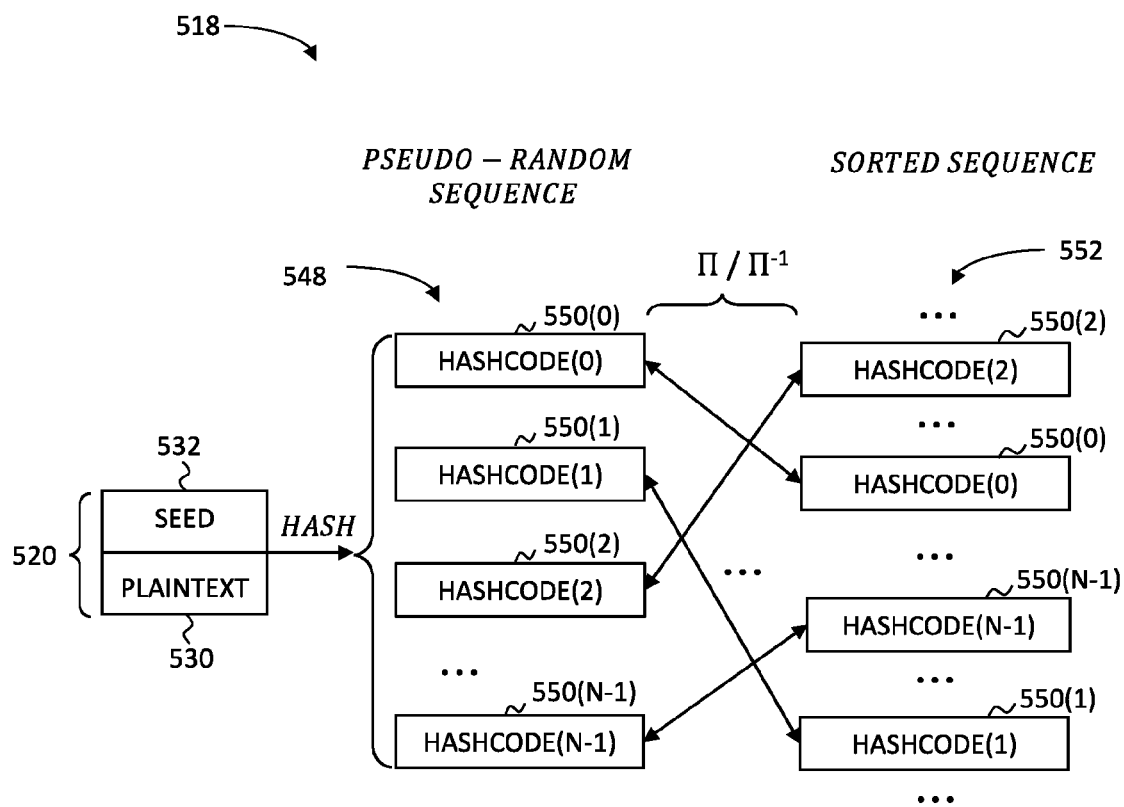
Figure 5D:
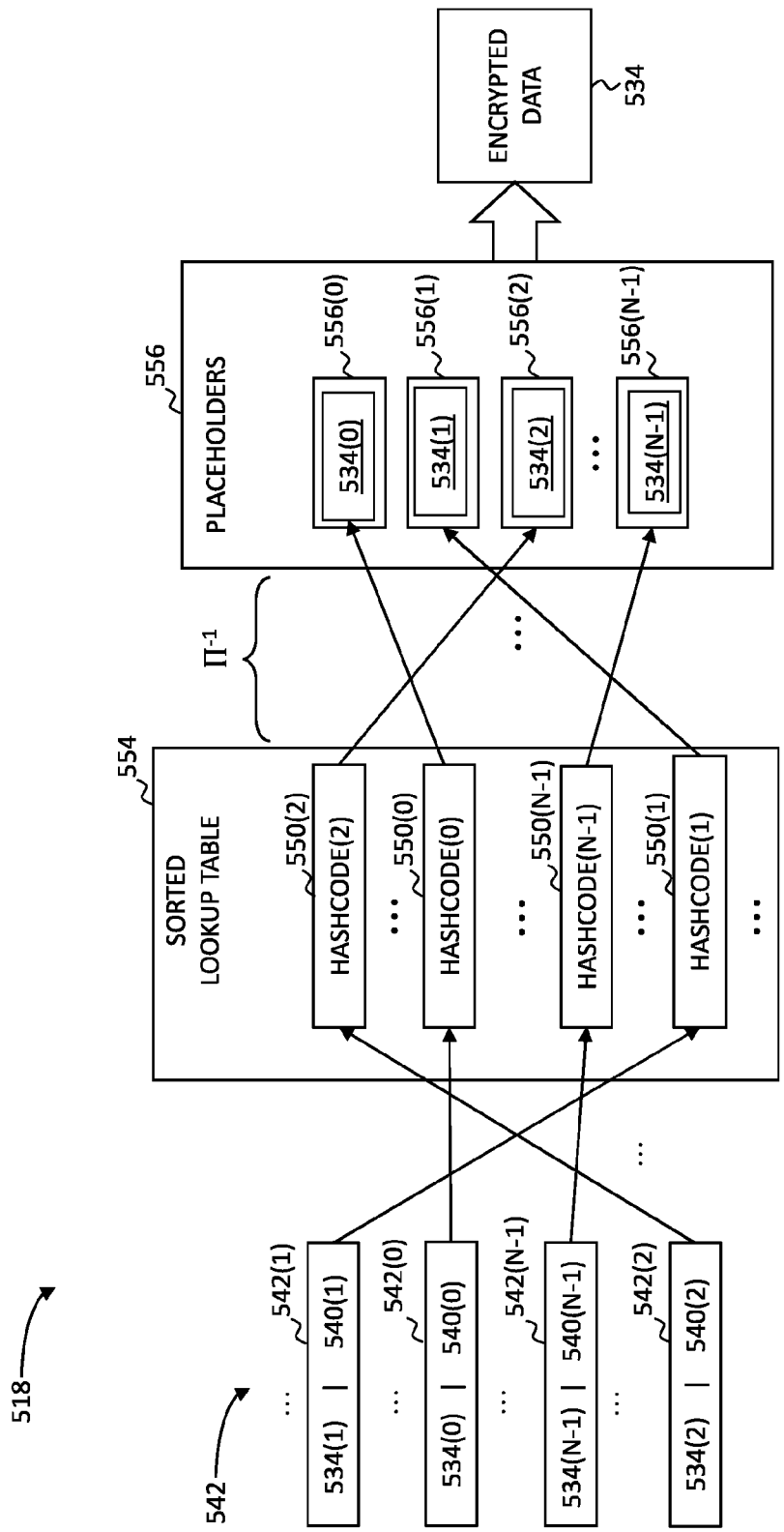

Referring to FIGS. 5C-5D, a technique for creating digital receiver 518 from credential 520 is shown, constructed and operative in accordance with an embodiment of the invention. Digital receiver 518 corresponds to digital transmitter 516, and is operative to tune into the digital carrying frequency defined by credential 520. Device 504 produces a pseudo-random sequence 548 of N hash codes 550(0) . . . 550(N-1) from credential 520 using the techniques described above, such that pseudo-random sequence 548 corresponds to pseudo-random sequence 538 of FIG. 5B. Thus, combining the payloads of incoming packets 542 according to pseudo-random sequence 548 recovers encrypted data 534. Device 504 sorts pseudo-random sequence 548 to produce a sorted sequence 552 for hash codes 550(0) . . . 550(N-1). Device 504 maps pseudo-random sequence 548 to sorted sequence 552 to derive a permutation $\pi$ and its inverse $\pi^{-1}$, e.g. $\pi$ maps pseudo-random sequence 548 to sorted sequence 552, and $\pi^{-1}$ maps sorted sequence 552 to pseudo-random sequence 548.

Referring to FIG. 5D, device 504 stores sorted hash codes 550(0) . . . 550(N-1) in a sorted lookup table 554. Sorted lookup table 554 may include other similarly sized hash codes corresponding to other files and messages, such that hash codes 550(0) . . . 550(N−1) are dispersed throughout lookup table 554. Sorting lookup table 554 serves several purposes. Sorting facilitates the matching of incoming packet headers 540(0) . . . 540(N−1) to hash codes 550(0) . . . 550(N−1) in lookup table 554. Sorting additionally scrambles hash codes 550(0) . . . 550(N−1), associated with encrypted data 534, throughout other hash code entries of lookup table 554, effectively encrypting lookup table 554. If an attacker were to steal lookup table 554, it would be difficult to identify the specific hash codes 554(0) . . . 554(N−1) associated with encrypted data 534 from the other hash codes stored in lookup table 554. Even if the attacker could identify hash codes 554(0) . . . 554(N−1) for encrypted data 534, guessing pseudo-random sequence 552 from the 1/N! possible sequences for hash codes 554(0) . . . 554(N−1) to correctly reassemble pieces 534(0) . . . 534(N−1) would be difficult.

Device 504 receives packets 542 in the shuffled sequence, optionally interspersed with additional data packets and/or noise packets. Device 504 matches headers 540(0) . . . 540(N−1) of packets 542 against hash codes 550(0) . . . 550(N−1) of sorted lookup table 554, thereby arranging packets 542(0) . . . 542(N−1) according to sorted sequence 552 (FIG. 5C). Device 504 parses out pieces 534(0) . . . 534(N−1) from packets 542(0) . . . 542(N−1), now arranged according to sorted sequence 552, and applies inverse permutation $\pi^{-1}$ to arrange pieces 534(0) . . . 534 (N−1) according to pseudo-random sequence 548 (FIG. 5C), corresponding to original sequence 536 (FIG. 5B). Device 504 assembles pieces 546(0) . . . 546(N−1) according to original sequence 536 to recover encrypted data 534.

In some embodiments, to prepare for receiving packets, device 504 allocates placeholders 556, labelled 556(0) . . . 556(N−1), for subsequently storing the incoming payloads of packets 542 according to original sequence 536. Device 504 maps hash codes 550(0) . . . 550(N−1) of sorted lookup table 554 to placeholders 556(0) . . . 556(N−1) according to inverse permutation $\pi^{-1}$, mapping sorted sequence 552 to pseudo-random sequence 548 (corresponding to original sequence 536). Optionally, device 504 maps hash codes 550(0) . . . 550(N−1) to placeholders 556(0) . . . 556(N−1) with hash pointers to conceal inverse permutation $\pi^{-1}$. Device 504 indexes placeholders 556(0) . . . 556(N−1) with hash pointers computed by hashing hash codes 550(0) . . . 550(N−1) with a secret salt value. The secret salt value may be internal to device 504, derived from credential 520, or received from device 502. Optionally, after creating lookup table 554 and indexing placeholders 556, device 504 discards the secret salt value. Prior to sending packets 542, device 502 sends the secret salt value to device 504 in an initiation packet. On receiving packets 542, device 504 dynamically calculate the hash pointers in real-time from incoming packet headers 540(0) . . . 540(N−1) and the secret salt value. Device 504 uses the hash pointers to insert pieces 534(0) . . . 534(N−1) into the correct placeholders 556(0) . . . 556(N−1). Thus, stealing lookup table 554 is not sufficient to enable communication with device 504 without the secret salt value.

An exemplary unscrambling of incoming packet 542(2) is now described. Referring to FIG. 5C, hash code 550(2) is positioned first in sorted sequence 552 but third in pseudo-random sequence 548, in accordance with inverse permutation $\pi^{-1}$. Accordingly, in FIG. 5D, device 504 positions hash code 550(2) first in sorted lookup table 554 with respect to the other hash codes for encrypted data 534. Device 504 maps hash code 550(2) from the first position in lookup table 554 to the third position 556(2) in placeholders 556 with a hash pointer by hashing hash code 550(2) with a salt value. Device 504 stores the resulting hash pointer in association with placeholder 556(2). Device 504 discards the salt, and waits for device 502 to initiate communication. Device 504 receives an initiation message from device 502 with the salt. Device 504 receives packets 542 in an arbitrary sequence, optionally interspersed with other packets, and matches the incoming packet headers against the entries of lookup table 554. When device 504 receives packet 542(2) last, device 504 matches header 540(2) with hash code 550(2) of lookup table 554, positioning packet 542(2) first, in accordance with sorted sequence 552. Device 504 hashes hash code 550(2) with the salt to compute the hash pointer, which points to placeholder 556(2) positioned third, corresponding to pseudo-random sequence 548 (which corresponds to original sequence 536). Device 504 parses piece 534(2) from packet 542(2) and inserts piece 534(2) into placeholder 556(2). Device 504 performs the above steps for all the incoming packets. Thus, the sequence for incoming packets can be arbitrary and independent of pseudo-random sequence 548 or sorted sequence 552.

Lookup table 554 operates as filter for incoming packets 542, allowing device 504 to identify packets 542 from any other incoming packets and discard unmatched packets. Inverse permutation $\pi^{-1}$ unscrambles packets 542, allowing device to assemble pieces 534 in the correct sequence to recover encrypted data 534. Consequently, device 504 uses credential 520 to build digital receiver 518 corresponding to digital transmitter 516 (FIG. 5A). Digital receiver 518 tunes into data 534 from the other incoming traffic 512 on channel 510, where hash codes 550(0) . . . 550(N−1) function as the digital carrying frequency corresponding to credential 520.

As noted above, devices 502 and 504 can each implement digital transmitter 516 and digital receiver 518, allowing for two-way encrypted communication. In some embodiments, devices 502 and 504 flood the channel with a steady level of traffic whether or not data is transmitted. For example, devices 502 and 504 hash discarded packets to generate unique noise packets so as not to reveal a pattern. Devices 502 and 504 each have a lookup table based on one or more predetermined credentials to tune into incoming packets when communication commences. To send a message, the number of noise packets on the channel is adjusted to maintain a steady level of traffic such that third party cannot determine if and when devices 502 and 504 are communicating, or how much information is exchanged. Without the necessary credential, an intruder cannot create the digital antennae and is left with fragmented and shuffled encrypted data pieces. Since the pieces are encrypted and appear identical, the complexity of filtering and reassembling the pieces correctly to reconstruct decipherable data is considerable. The ability of parties to actively communicate via the tuning key authenticates them, proving that each possesses the credential.

Figure 6:
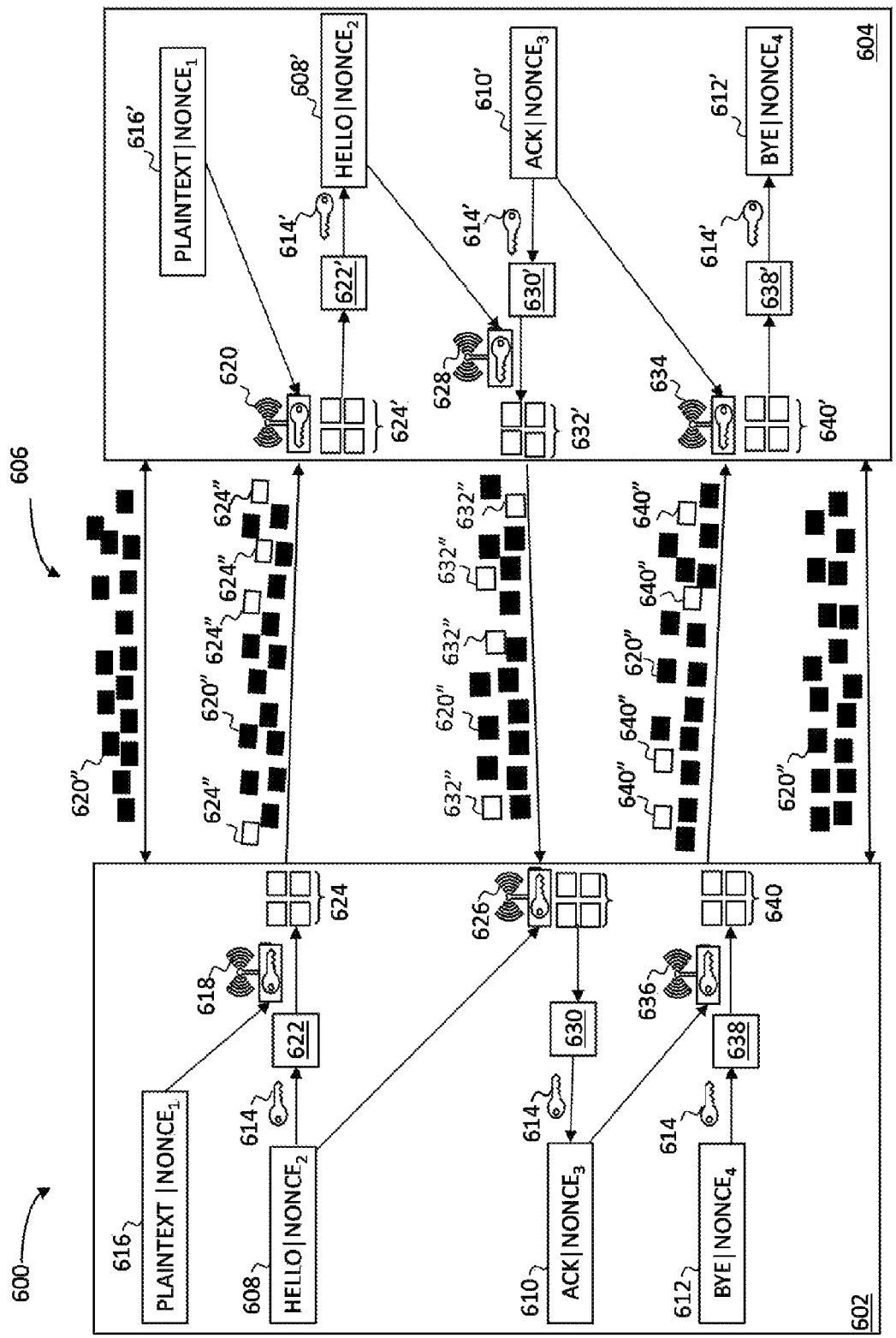
FIG. 6 illustrates an exemplary communications protocol using the digital antennae of FIGS. 5A-5D, constructed and operative in accordance with another embodiment of the invention.

Reference is now made to FIG. 6 which illustrates an exemplary communications protocol 600 using the digital antennae of FIGS. 5A-5D, constructed and operative in accordance with an embodiment of the invention. Protocol 600 is implemented by computing devices 602 device 604 communicating over a channel 606. The progress of protocol 600 is shown over time, starting from the top of FIG. 6 and ending at the bottom. Protocol 600 begins with device 602 sending a first HELLO message 608 to device 604. Device 604 replies to HELLO 608 with a second message, ACK 610. Device 602 replies to ACK 610 by sending a third message, BYE 612 to device 604. For the purpose of clarity, the following convention is used when referring to multiple copies of the same data. When the data is at device 602, a reference number is used with no additional annotation, e.g. first message 608. When the same data is referenced at device 604, a single quote is added to the reference number e.g. first message 608'. When the data is referenced while in transmission over channel 606, a double quote is added to the reference number, i.e. packets 624", as distinguished from packets 624 at device 602 and packets 624' at device 604. Optionally, when devices 602 and 604 are not communicating, devices 602 and 604 flood channel 606 with noise packets 620".

Prior to initiating protocol 600, devices 602 and 604 establish a session key 614 for securing data using conventional techniques. Additionally, devices 602 and 604 share one or more credentials, such as a first credential 616 comprising a first plaintext and a first seed for creating corresponding digital antennae using the technique described above with respect to FIG. 5A-5D. The first seed is denoted as a nonce$_1$ (i.e. number used once).

Device 602 prepares to initiate protocol 600 by creating a digital transmitter 618 from credential 616, which will be used to send HELLO 608 to device 604 according to the technique of FIG. 5B. Device 604 prepares to receive a message from device 602 by creating a corresponding digital receiver 620 from credential 616', according to the technique of FIGS. 5C-5D. Thus, a message transmitted by digital transmitter 618 can only be recovered via digital receiver 620, mutually authorizing the sender and receiver message 608 as holders of first credential 616 and 616', respectively. In some embodiment, device 604 configures digital receiver 620 with hash pointers, as described above, discards the first seed (and/or credential 616'), and creates an entry in the lookup table for receiving an initialization packet from device 602 with the first seed. Devices 602 and 604 may similarly create a digital receiver and corresponding transmitter to enable device 604 to initiate communication, such as by applying the above technique after incrementing nonce by N (for N packets per message). Similarly, devices 602 and 604 can prepare packet headers and corresponding lookup table entries to handle error messages and the like.

Before beginning protocol 600, devices 602 and 604 flood channel 606 with noise packets 620". Although noise packets are indicated by the same reference number 620", each noise packet is a unique sequence of random or pseudo-random bits, such that monitoring channel 606 does not reveal any pattern.

To send HELLO 608 to device 604, device 602 obtains a second nonce$_2$ and concatenates nonce$_2$ to message 608, to form a second credential that will be shared with device 604. Nonce$_2$ ensures that the subsequently encrypted HELLO message 608 will be unique, even for repeat instances of the same message during the session, such that monitoring channel 606 over time will not reveal a repetition which could leak information. Nonce$_2$ is additionally used, i.e. repurposed, as part of a second credential to create unique digital antennae for the message in response, such that decrypting HELLO 608 is necessary to proceed with protocol 600. Device 602 encrypts HELLO 608 concatenated with nonce$_2$ using session key 614 to produce an encrypted first message 622. Device 602 uses digital transmitter 618, based on first shared credential 616, to disperse encrypted first message 622 into packets 624 as described above. Device 602 creates packets 624 to be indistinguishable from noise packets 620", i.e. size and format. Device 602 scrambles packets 624 and sends scrambled packets 624" (indicated in white) interspersed with noise packets 620" (black) over channel 606 to device 604. Device 602 adjusts the amount of noise packets 620" sent with packets 624" such that the overall traffic over channel 606 remains substantially unchanged, and a party listening to channel 606 cannot determine that packets 624" are being sent. Essentially, this technique implements real-time steganography over channel 606.

To prepare for subsequently receiving a response to HELLO 608 from device 604, device 602 creates a digital receiver 626 based on the second credential with HELLO 608 as the plaintext and nonce$_2$ as the seed. Nonce$_2$ ensures unique encryption of HELLO 608 and additionally, that only digital receiver 626 can tune into a message sent in response to HELLO 608. Thus, a decrypted message is used to encrypt the message in response.

To receive HELLO 608', device 604 uses digital receiver 620, based on credential 616', to tune into incoming packets 624" from noise packets 620" on channel 606 according to the technique described above of FIG. 5D. Device 604 creates a lookup table to filter incoming packets 624' from other incoming traffic by matching the packet headers against the entries in the lookup table derived from credential 616'. Device 604 discards any packets without matching headers as noise, optionally recycling them by hashing to create new noise packets with which to flood channel. Device 604 parses out the payloads from matching packets 624' and reassembles them using first credential 616' to recover encrypted first message 622'. Device 604 decrypts encrypted first message 622' with session key 614' and parses out nonce$_2$ to obtain HELLO 608'. Device 604 now has the second shared credential comprising HELLO 608' and nonce$_2$.

To respond to first message 608' with ACK 610', device 604 creates a digital transmitter 628 using the second shared credential with HELLO as the plaintext and nonce$_2$ as the seed. Digital transmitter 628 at device 604 corresponds to digital receiver 626 at device 602. Thus, successfully receiving a coherent response to HELLO 608 via digital receiver 626 proves that the response was sent from digital transmitter 628.

Device 604 prepares ACK 610' in response to HELLO 608'. Device 604 concatenates a third nonce$_3$ to ACK 610', forming a third credential to share with device 602. Device 604 encrypts ACK 610' and nonce$_3$ with session key 614' to produce a second encrypted message 630'. Device 604 uses digital transmitter 628, based on the second credential (i.e. HELLO 608' and nonce$_2$) to disperse second encrypted message 630' into packets 632', as described above. Device 604 scrambles packets 632' and sends scrambled packets 632' (white) interspersed with noise packets 620" (black) over channel 606 to device 602, adjusting the amount of noise packets 620" such that the overall traffic over channel 606 remains substantially unchanged. To prepare for receiving a response to ACK 610' from device 602, device 604 creates a digital receiver 634 from a third credential formed from ACK 610' and nonce$_3$, as described above for digital receiver 626.

To receive ACK 610 from device 604, device 602 uses digital receiver 626, based on HELLO 608 and nonce$_1$, to tune into incoming packets 632" from noise packets 620" on channel 606. Device 602 identifies packets 632 and combines them to recover encrypted message 630. Device 602 decrypts message 630 with session key 614 and parses out nonce$_3$ to obtain ACK 610. Device 602 now has the third shared credential comprising ACK 610 and nonce$_3$.

In a similar manner, device 602 responds to ACK 610 with BYE 612 using a digital transmitter 636 based on the third shared credential, with ACK 610 as the plaintext and nonce$_3$ as the seed. Device 602 concatenates a fourth nonce$_4$ to BYE 612, and encrypts and transmits this as described above, using digital transmitter 636. Device 604 similarly tunes into BYE 612' with digital receiver 634, corresponding to digital transmitter 636. Device 604 recovers BYE 638 and parses out nonce$_4$. Thus, devices 602 and 604 create digital receivers and transmitters in real-time based on the previous decrypted message received from device 604 and 602, respectively, continually authenticating each to the other.

BYE 612 is the final message for protocol 600. Devices 602 and 604 create a fourth credential (not shown) from BYE 612 and nonce$_4$ for the next session. After this session ends, devices 602 and 604 continue flooding channel 606 with noise 620" such that a listener cannot determine if and when communication began or ended, nor how much information was exchanged.

The technique described above may be used to exchange any number of messages, for example to establish a new session key or to implement a login, and the like. For example, protocol 600 may be used to login and establish a credential and/or a session key for subsequent use, such as to communicate according to the method of FIGS. 1B-1D, i.e. apply a permutation to a contiguous block of data, as opposed to dispersing into packets. It is to be noted that although the description above refers to a symmetric key 614, the technique may be applied to asymmetrically encrypted data, or data encrypted with a one-way hash. In the last case, there is no need to decrypt the message after it has been assembled by the receiver. Additionally, the exemplary implementation above relates to using a message body as a credential, however this is not intended to limit the invention, and the credential may be based on any string of characters, such as plaintext 120 of FIG. 1B.

In some implementations, communication via protocol 600 does not require a user to login. Once a connection is established, devices 602 and 604 continually transmit traffic to each other and tune into each other's transmitted message to establish new digital antennae for a new session.

Figure 7:
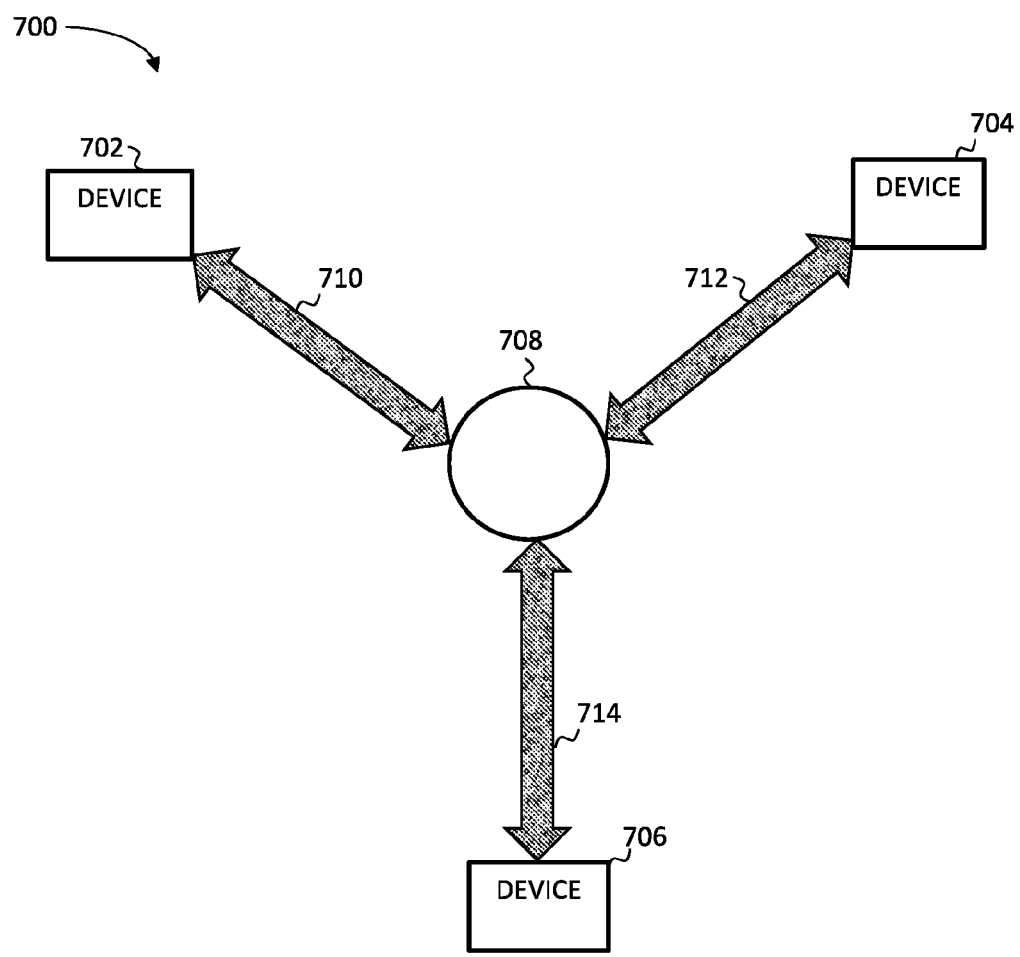
FIG. 7 illustrates an extension of the exemplary communications protocol of FIG. 6 to a network connecting any number of devices, constructed and operative in accordance with another embodiment of the invention.

Reference is now made to FIG. 7 which illustrates an extension of the protocol of FIG. 6 to a network connecting any number of devices, constructed and operative in accordance with an embodiment of the invention. A network 700 includes multiple computing devices, 702, 704, and 706 connected to each other via a hub 708 over physical channels 710, 712, and 714. Hub 708 may be a switch or router connecting devices 702, 704, and 706 via physical channels 710, 712 and 714. Devices 702, 704 and 706 implement the encrypted communications technique described above with each other. Each of pair of devices 702, 704, and 706 establishes a separate credential with which to communicate, i.e. devices 702 and 704 establish a first secret credential, devices 702 and 706 establish a second secret credential, and devices 704 and 706 establish a third secret credential. The secret credentials are used to create digital transmitters and corresponding digital receivers according to the technique described above with respect to FIGS. 5B-5D.

Devices 702, 704, and 706 combine the lookup tables for different credentials into a single sorted lookup table for matching any incoming packet. Thus, the sorted lookup table at device 702 includes hash code entries for the first credential shared with device 704 and the second credential shared with device 706. Sorting the lookup table serves to scramble the hash codes for different credentials throughout the lookup table, such that if the lookup table is stolen, an attacker cannot know which hash codes are associated with which credential, nor how to order the hash codes to form a coherent message. The attacker attempting to spoof a message using the stolen lookup table could quickly be detected.

When not actively communicating, devices 702, 704 and 706 flood channels 710, 712, and 714 with noise packets detection if and when a message is being sent. Moreover, a packet sent by a digital transmitter based on one credential can only be detected by a corresponding digital receiver based on the same credential, and is perceived as noise by a device lacking the credential. This is because there is no matching entry in the lookup table for the packet header. Consequently, the packet will be discarded. In this manner, once device's message is another device's noise. For example, device 702 disperses a message targeted to device 704 into packets using a digital transmitter based on the first credential shared with device 704. Device 704 has the corresponding digital receiver, i.e. the lookup table at device 704 has hash code entries matching the packet headers carrying the message. Device 702 sends the same communication to each device in network 700. Thus, device 702 sends the packets to both device 704 and device 706. Device 704 matches the incoming packet headers against the lookup table and reads the message. However, device 706 cannot match the packet headers and discards the packets.

Each device in network 700 sends every message packet to every other device in the network, contributing to the steady level of noise over channels 710, 712, ad 714. However, only the device with the necessary credential can tune into the message. The other devices, lacking the credential, will discard unmatched packets as noise. By having all devices communicate at full capacity at all times, an intruder cannot know when or if communication is taking place, or how much information is being exchanged, since the data is indistinguishable from noise.

Figure 8A:
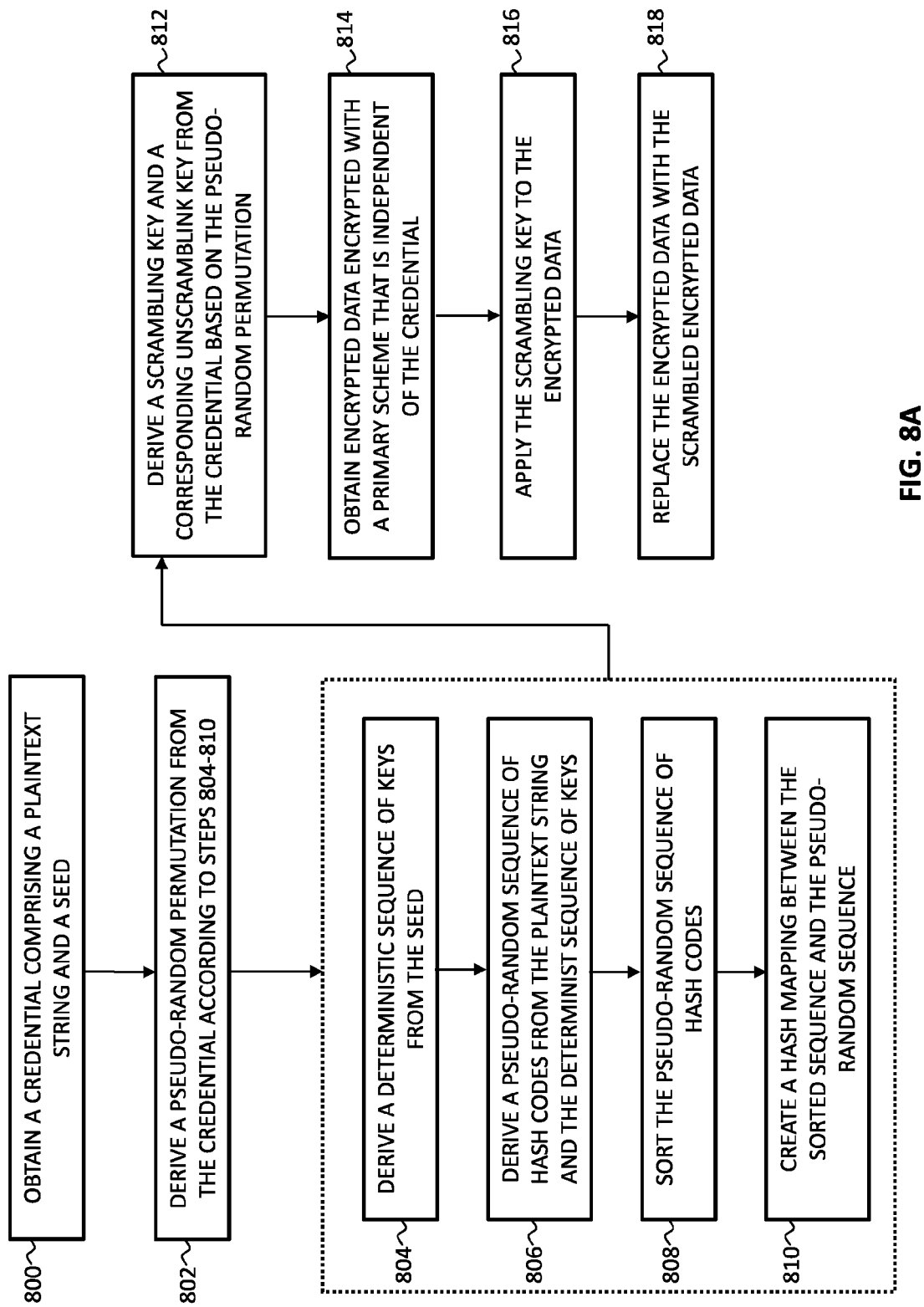
FIG. 8A is a flowchart of a method for securing encrypted data with a credential, constructed and operative in accordance with another embodiment of the invention.

Reference is now made to FIG. 8A which is a flowchart of a method for securing encrypted data with a credential, constructed and operative in accordance with an embodiment of the invention.

In Step 800, a credential comprising a plaintext string and a seed is obtained. In some embodiments, the plaintext string is associated with at least one of: a password, a passphrase, biometric information, a message, a query term, a device identifier, a user identifier, a timestamp, a location identifier, an address, and a label. Referring to FIG. 1B, device 100 obtains a credential comprising plaintext 120 and seed 122.

In Step 802 a pseudo-random permutation is derived from the credential. In some embodiments, a pseudo-random permutation is derived by performing Steps 804 to 810:

In Step 804 a deterministic sequence of keys is derived from the seed.

In Step 806, a pseudo-random sequence of hash codes is derived from the plaintext string and the deterministic sequence of keys.

In Step 808, the pseudo-random sequence of hash codes is sorted to produce a sorted sequence.

In Step 810, a hash mapping is created between the pseudo-random sequence and the sorted sequence, where the pseudo-random permutation corresponds to the hash mapping.

Referring to FIG. 1B, device 100 derives a deterministic sequence of N keys 124 (e.g. keys 124(0) ... 124(N−1)) from seed 122. Device 100 derives a pseudo-random sequence 126 of N hash codes 128(0) ... 128(N−1) from plaintext string 120 and deterministic sequence of keys 124, for example by applying an HMAC function to plaintext string 120 with each one of keys 124(0) ... 124(N−1). Device 100 sorts pseudo-random sequence 126 to produce sorted sequence 130 of hash codes 128(0) ... 128(N−1).

Device 100 maps sorted sequence 130 to pseudo-random sequence 126 to produce a "hash mapping". Pseudo-random permutations, $\pi$ and $\pi^{-1}$, correspond to the bi-directional mappings between sorted sequence 130 and pseudo-random sequence 126.

In Step 812, a scrambling key and a corresponding unscrambling key are derived from the credential, where the corresponding unscrambling key is based on the pseudo-random permutation derived from the credential. In some embodiments, the scrambling key is also based on the pseudo-random permutation. Referring to FIG. 5A, devices 502 and 504 derive scrambling key 522 and corresponding unscrambling key 524 from credential 520. Referring to FIG. 5D, device 504 derives unscrambling key $\pi^{-1}$ from the pseudo-random permutation derived from credential 520 (FIG. 5C). Referring to FIGS. 1B-1D, both the scrambling key $\pi$ (FIG. 1C) and unscrambling key $\pi^{-1}$ (FIG. 1D) are based on the pseudo-random permutation derived in FIG. 1B by mapping pseudo-random sequence 126 to sorted sequence 130.

In Step 814, encrypted data is obtained, where the encrypted data has been encrypted with a primary scheme that is independent of the credential. Referring to FIG. 1B, device 100 obtains encrypted data 140. Encrypted data 140 is encrypted with a primary scheme that is independent of plaintext string 120 and seed 122.

In Step 816, the scrambling key is applied to the encrypted data to produce scrambled encrypted data, where recovering the encrypted data from the scrambled encrypted data requires applying the unscrambling key.

In some embodiments, the scrambling key is based on the pseudo-random permutation, where applying the scrambling key to the encrypted data comprises fragmenting the encrypted data into pieces and applying the pseudo-random permutation to the pieces. Applying the unscrambling key comprises fragmenting the scrambled encrypted data into scrambled encrypted pieces and applying the inverse of the pseudo-random permutation to the scrambled encrypted pieces. Referring to FIG. 1C, device 100 fragments encrypted data 140 into pieces 140(0) . . . 140(N−1), ordered in original sequence 142. Device 100 applies pseudo-random permutation $\pi$ to pieces 140(0) . . . 140(n−1) to produce doubly encrypted data 146. Referring to FIG. 1D, device 100 fragments doubly encrypted data 146 into pieces 140(0) . . . 140(N−1), ordered according to the permutated, scrambled sequence, i.e. $\pi$(140(0) . . . 140(N−1)). Device applies inverse permutation $\pi^{-1}$ to restore original sequence, i.e. $\pi^{-1}\pi$(140(0) . . . 140(N−1)).

In Step 818, the encrypted data is replaced with the scrambled encrypted data, thereby securing the encrypted data with the credential. Referring to FIG. 2, doubly encrypted data (flow arrow 224) is archived at storage device 216 in place of block-cipher encrypted data.

In some embodiments, the credential is associated with a first security protocol, and the primary scheme is associated with a second security protocol, thereby coupling the first security protocol with the second security protocol. Referring to FIG. 3, plaintext 312 is associated with an authentication protocol at application layer 308, whereas session key 326 for encrypting data is associated with a security protocol for transport layer 310. Applying scrambling key 318 at transport layer 310 couples transport layer 310 to application layer 308.

In some embodiments, the encrypted data is encrypted with the primary scheme at a first device, and the scrambling key is applied to produce the scrambled encrypted data by a second device, where the credential is kept secret from the first device, thereby distributing data encryption between the first and second devices. Referring to FIG. 2, computer service 206 encrypts data with a block cipher, and sends the block-cipher encrypted data to device 202 (flow arrow 222). Device 202 applies a scrambling key, based on a secret credential, to the block-cipher encrypted data to produce scrambled encrypted data (i.e. "doubly encrypted data"). Device 202 uploads the doubly encrypted data to computer service 206 (flow arrow 224) for archiving at storage device 216. Device 202 retains control over the data, while off-loading the computationally heavy encryption to computer service 206.

In some embodiments, applying the scrambling key to produce the scrambled encrypted data is performed by a first device, and the first device is configured to transmit the scrambled encrypted data to a second device. Applying the unscrambling key to recover the encrypted data is performed by the second device, where the credential is shared between the first and second devices. Referring to FIG. 5A, device 502 applies scrambling key 522 to produce scrambled encrypted data 542. Device 502 transmits scrambled encrypted data 542 to device 504. Device 504 applies unscrambling key 524 to recover the encrypted data. Device 502 and 504 share credential 520 for deriving scrambling key 522 and unscrambling key 524 over secure channel 526.

Figure 8B:
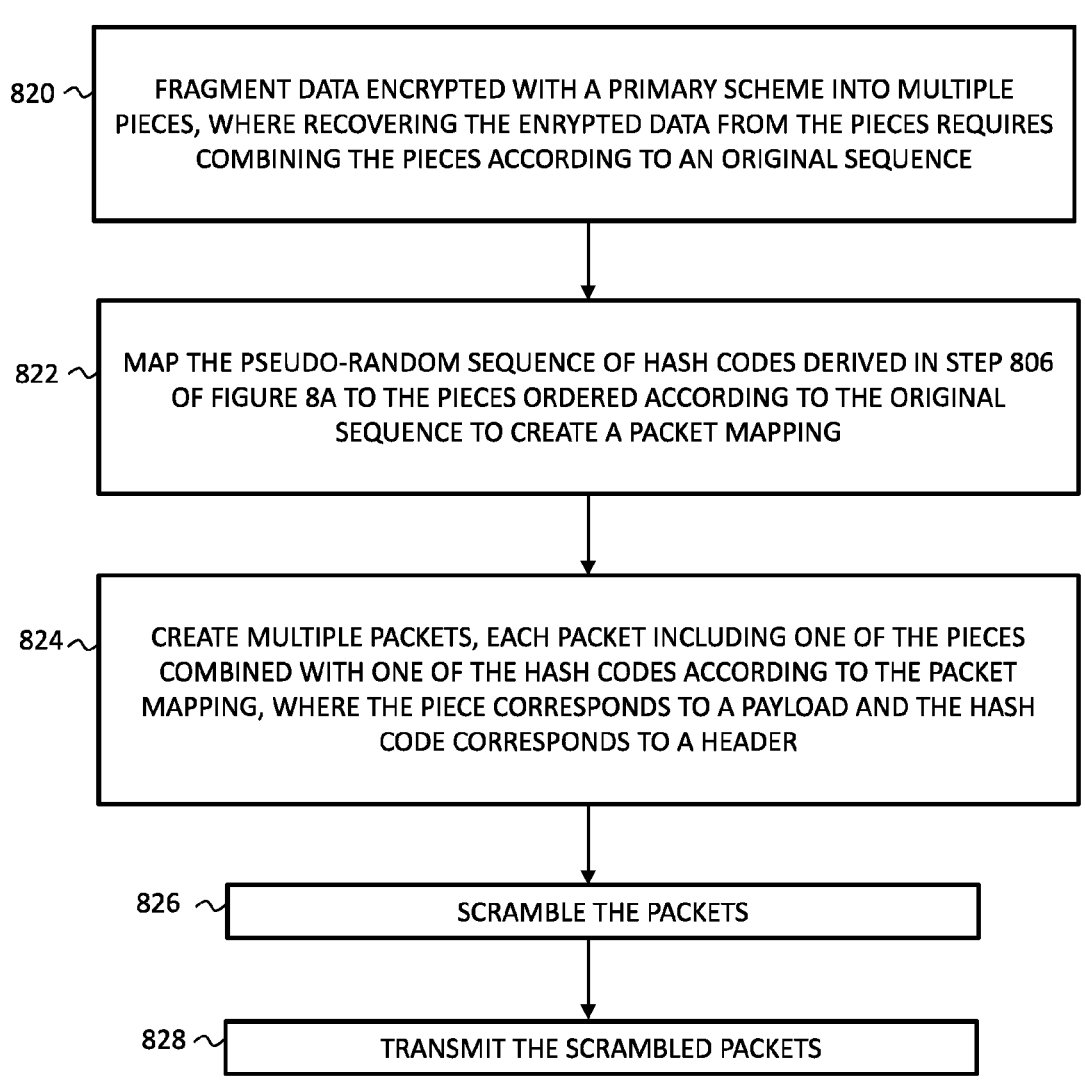
FIG. 8B is a flowchart of a method for using a scrambling key derived from a credential as a digital transmitter operating at a digital frequency corresponding to the credential, constructed and operative in accordance with another embodiment of the invention.

Reference is now made to FIG. 8B which is a flowchart of a method using a scrambling key derived from a credential as a digital transmitter operating at a digital frequency corresponding to the credential, constructed and operative in accordance with an embodiment of the invention.

In Step 820, data, encrypted with a primary scheme, is fragmented into pieces, where recovering the encrypted data from the pieces requires combining the pieces according to an original sequence. Referring to FIG. 5B, encrypted data 534 is fragmented into pieces 534(0) . . . 534(N−1), such that recovering encrypted data 534 from pieces 534(0) . . . 534(N−1) requires combining the pieces according to original sequence 536.

In Step 822, the pseudo-random sequence of hash codes, derived from the credential in Step 806 of FIG. 8A, is mapped to the pieces ordered according to the original sequence to create a packet mapping. Referring to FIGS. 5A-5B, credential 520 includes plaintext string 530 and seed 532. Pseudo-random sequence 538 of hash codes 540(0) . . . 540(N−1) is derived by applying a cryptographic hash function to plaintext 530 and each key of the deterministic sequence of N keys derived from seed 532, according to the method of FIG. 1B. Pseudo-random sequence 538 of hash codes 540(0) . . . 540(N−1) is mapped to pieces 534(0) . . . 534(N−1) ordered according to original sequence 536, indicated in FIG. 5B by double-headed arrows between pieces 534(0) . . . 534(N−1) and hash codes 540(0) . . . 540(N−1).

In Step 824, multiple packets are created, each of the packets including one of the pieces combined with one of the hash codes in accordance with the packet mapping, where the one piece corresponds to a payload and wherein the one hash code corresponds to a header of the packet. Referring to FIG. 5B, multiple packets 542(0) . . . 542(N−1) are created, each including one of pieces 534(0) . . . 534(N−1) combined with one of hash codes 540(0) . . . 540(N−1) in accordance with the mapping of Step 822.

In Step 826, the multiple packets are scrambled. Referring to FIG. 5B, packets 542 are scrambled using any suitable technique, such as by randomly or pseudo-randomly shuffling packets 542. For example, a random nonce may be repeatedly hashed to produce a hash sequence. The hash sequence is mapped to packets 542. Sorting the hash sequence scrambles packets 542.

In Step 828, the multiple scrambled packets are transmitting, thereby applying the credential as a digital transmitter that transmits the encrypted data at a digital carrying frequency corresponding to the pseudo-random sequence of hash codes derived from the credential. Referring to FIGS. 5A-5B, device 502 transmits packets 542(0), 542(1), 542(2), and 542(3) to device 504 over channels 508 and 510 via network 506. The headers of packets 542(0), 542(1), 542(2), and 542(3) correspond to hash codes 540(0), 540(1), 540(2), and 540(3) derived from credential 520. The packet headers are subsequently used by device 504 to filter incoming packets 542(0), 542(1), 542(2), and 542(3) from other traffic 512 received over channel 510, to tune into the message sent by device 502. Thus, hash codes 540(0), 540(1), 540(2), and 540(3) carry the message (i.e. pieces 534(0) . . . 534(n−1)) from device 502 to device 504.

In some embodiments, additional packets are created that are indistinguishable from the multiple scrambled packets carrying the encrypted data. The multiple scrambled packets are transmitted interspersed with the multiple additional packets to obfuscate the transmission of the multiple scrambled packets from the first device to the second device. Referring to FIG. 5A, device 502 sends device 504 a steady level of traffic 512, comprising packets that are indistinguishable from message packets 542(0), 542(1), 542(2) and 542(3) over channels 508 and 510. Device 502 sends message packets 542(0), 542(1), 542(2) and 542(3) interspersed within traffic 512 to obfuscate the transmission of packets 542(0), 542(1), 542(2) and 542(3), such that a listener into channels 508 and 510 cannot tell if and when a message is sent, nor how large the message is.

In some embodiments, the additional packets are any of: noise packets, and third-party message packets targeted for a third device where the third-party message packets are identified as noise packets by the second device. Referring to FIG. 6, message packets 624″ are interspersed within noise packets 620″. Referring to FIG. 7, devices 702 and 704 share a first credential, devices 702 and 706 share a second credential, and devices 704 and 706 share a third credential. Device 702 disperses a first message into a first set of packets using the first credential and sends the first set of packets to devices 704 and 706 over channels 710, 712 and 714, interspersed within additional network traffic. Device 702 disperses a second message into a second set of packets using the second credential and sends the second set of packets to devices 704 and 706 over channels 710, 712 and 714, interspersed within traffic. Device 704 has the first credential and builds a digital receiver to identify the packet headers of the first message, i.e. tune into the first message at the carrying frequency corresponding to the first credential. However, device 704 does not have the second credential and therefore cannot build a digital receiver to identify the packet headers of the second message. Device 704 discards the second set of packets since they are indistinguishable from noise. Similarly, device 706 tunes into the second message using a digital receiver built from the second credential to identify the second set of packets, but discards the first set of packets as indistinguishable from noise.

Figure 8C:
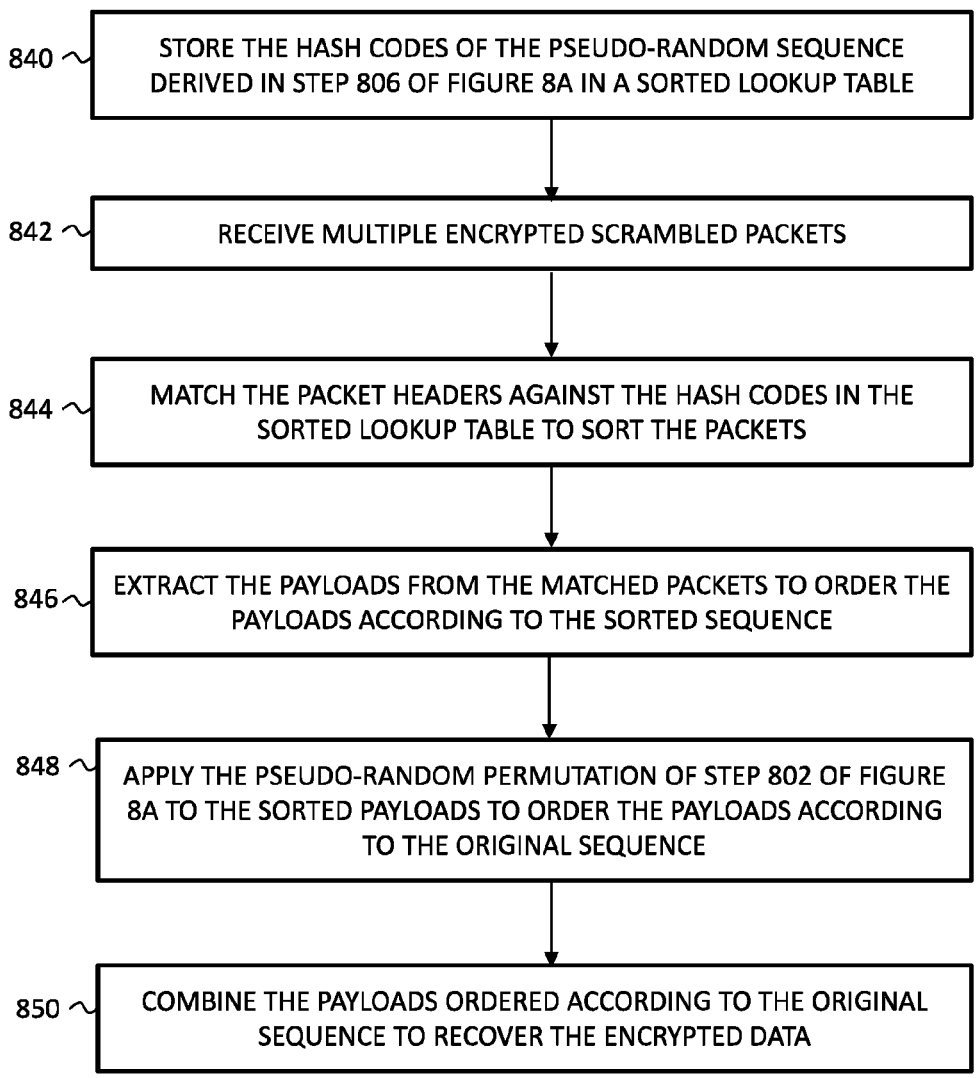
FIG. 8C is a flowchart of a method for using an unscrambling key derived from a credential as a digital receiver operating at a digital frequency corresponding to the credential, constructed and operative in accordance with another embodiment of the invention.

Reference is now made to FIG. 8C which is a flowchart of a method for using an unscrambling key derived from a credential as a digital receiver operating at a digital frequency corresponding to the credential, constructed and operative in accordance with an embodiment of the invention.

In Step 840, the hash codes of the pseudo-random sequence derived from the credential are stored in a sorted lookup table. Referring to FIG. 5C, device 504 derives pseudo-random sequence 548 of hash codes 550(0) . . . 550(N−1) from credential 520. Referring to FIG. 5D, device 504 sorts hash codes 550(0) . . . 550(N−1) and stores sorted hash codes 550(0) . . . 550(N−1) in sorted lookup table 554.

In Step 842, multiple scrambled packets are received. Referring to FIG. 5D, device 504 receives scrambled packets 542.

In Step 844, the headers of the multiple scrambled packets are matched against the hash codes in the sorted lookup table, to order the packets according to the sorted sequence. Referring to FIG. 5D, device 504 matches headers 540(0) . . . 540(N−1) of incoming scrambled packets 542(0) . . . 542(N−1) against hash codes 550(0) . . . 550(N−1) in sorted lookup table 554. By matching headers 540(0) . . . 540(N−1) against the entries of sorted lookup table 554, device 504 orders packets 542 according to ordered (i.e. sorted) sequence 552 (FIG. 5C).

In Step 846, the payloads of the multiple packets are extracted, thereby ordering the multiple payloads according to the sorted sequence. Referring to FIG. 5D, payloads 534(0) . . . 534(N−1) are extracted from sorted packets 542, thereby ordering payloads 534(0) . . . 534(N−1) according to ordered (i.e. sorted) sequence 552 (FIG. 5C).

In Step 848, the pseudo-random permutation, derived in Step 802 of FIG. 8A, is applied to the payloads ordered according to the sorted sequence, to order the payloads according to the original sequence. Referring to FIGS. 5C-5D, pseudo-random permutation $\pi^{-1}$, derived by mapping sorted sequence 552 to pseudo-random sequence 548 (FIG. 5C), is applied to payloads 534(0) . . . 534(N−1) ordered according to sorted sequence 552 of sorted lookup table 554 (FIG. 5D), ordering payloads 534(0) . . . 534(n−1) according to original sequence 536 (FIG. 5B).

In Step 850, the payloads ordered according to the original sequence are combined to recover the encrypted data. Referring to FIG. 5D, payloads 534(0) . . . 534(n−1) are combined according to original sequence 536 (FIG. 5B) to recover encrypted data 534.

In some embodiments, the encrypted data includes a response message sent from the first device to the second device. The credential corresponding to the digital carrying frequency for transmitting the response message (i.e. the response carrying frequency) is derived from an initial message that was transmitted from the second device to the first device at an initial carrying frequency corresponding to an initial credential shared between the first and second devices. In this manner, the communications between the first and second devices implements a frequency hop from the initial carrying frequency to the response carrying frequency, with the initial carrying frequency carrying the initial message from the second device to the first device, and the response carrying frequency, based on the initial message, carrying the response message from the first device to the second device.

Referring to FIG. 6, to sends ACK 610' to device 602 in response to receiving HELLO 608' from device 602, device 604 uses HELLO 608' with $nonce_2$ to create digital transmitter 628, corresponding to digital receiver 626 of device 602, i.e. the credential for deriving the hash code headers (response digital carrying frequency) for ACK packets 632' is HELLO 608' and $nonce_2$, received from device 602. Similarly, the credential used by device 602 to transmit HELLO 610 to device 604 is initial credential 616 with $nonce_1$, shared in advance between devices 602 and 604, i.e.

the credential for deriving the hash code headers (initial digital carrying frequency) for HELLO packets 632' is initial credential 616 with $nonce_1$. Thus, a decrypted plaintext message in one direction serves as the credential for transmitting the message in response. The communications between devices 602 and 604 implements a frequency hop from the initial carrying frequency carrying HELLO 608, based on hash codes derived from initial credential 616, to the response carrying frequency carrying ACK 610', based on hash codes derived from HELLO 608'.

The present invention may be a system, a method, and/or a computer program product. The computer program product may include a computer readable storage medium (or media) having computer readable program instructions thereon for causing a processor to carry out aspects of the present invention.

What is claimed is:

1. A system for securing encrypted data, comprising:
   at least one hardware processor;
   at least one non-transitory memory device having embodied thereon program code executable by the at least one hardware processor;
   a first device comprising a first one of said hardware processors and a first one of said non-transitory memory devices;
   a second device comprising a second one of said hardware processors and a second one of said non-transitory memory devices;
   a computer network configured to implement a distributed ledger; and
   a communications channel, wherein said first and second devices communicate with said computer network over said communications channel,
   wherein said at least one hardware processor is configured to
   establish a credential based on a user-defined plaintext string,
   obtain encrypted data, encrypted under a public key cryptography scheme,
   wherein said credential is independent of said public key cryptography scheme, and
   apply said credential as a symmetric key to said encrypted data encrypted under said public key cryptography scheme, thereby securing said encrypted data with said credential,
   wherein said credential is applied to secure a transfer of a token from a first user account on said distributed ledger, said first user account associated with said first device, to a second user account on said distributed ledger, said second user account associated with said second device,
   wherein said encrypted data corresponds to a public address corresponding to said second user account,
   wherein said credential is privately established between said first device and said second device, and
   wherein redeeming said token transferred to said second user account requires publishing a zero-knowledge proof of said credential to said distributed ledger.

2. The system of claim 1, wherein said at least one hardware processor is further configured to derive a one-time pad from said credential, wherein applying said credential comprises adding said one-time pad to said encrypted data.

* * * * *